US010726855B2

(12) United States Patent
Krasnov

(10) Patent No.: US 10,726,855 B2
(45) Date of Patent: Jul. 28, 2020

(54) SPEECH PRIVACY SYSTEM AND/OR ASSOCIATED METHOD

(71) Applicant: Guardian Glass, LLC, Auburn Hills, MI (US)

(72) Inventor: Alexey Krasnov, Canton, MI (US)

(73) Assignee: GUARDIAN GLASS, LLC., Auburn Hills, MI (US)

( * ) Notice: Subject to any disclaimer, the term of this patent is extended or adjusted under 35 U.S.C. 154(b) by 0 days.

(21) Appl. No.: 15/459,220

(22) Filed: Mar. 15, 2017

(65) Prior Publication Data

US 2018/0268834 A1 Sep. 20, 2018

(51) Int. Cl.

| | |
|---|---|
| ***G10K 11/175*** | (2006.01) |
| ***G10L 25/87*** | (2013.01) |
| ***G10L 15/12*** | (2006.01) |
| ***G10L 21/003*** | (2013.01) |
| ***G10L 25/48*** | (2013.01) |

(Continued)

(52) U.S. Cl.

CPC .......... *G10L 21/003* (2013.01); *G10K 11/175* (2013.01); *G10L 21/16* (2013.01); *G10L 25/48* (2013.01); *H04K 3/45* (2013.01); *H04K 3/46* (2013.01); *H04K 3/825* (2013.01); *H04K 3/84* (2013.01); *H04K 3/41* (2013.01); *H04K 2203/12* (2013.01)

(58) Field of Classification Search

CPC .... G10L 21/003; G10L 15/003; G10K 11/175

See application file for complete search history.

(56) References Cited

U.S. PATENT DOCUMENTS

| | | | |
|---|---|---|---|
| 1,483,365 | A | 2/1924 | Mazer |
| 2,132,642 | A | 10/1938 | Parsons |

(Continued)

FOREIGN PATENT DOCUMENTS

| | | |
|---|---|---|
| DE | 33335210 | 4/1985 |
| DE | 10 2014 111 365 | 2/2016 |

(Continued)

OTHER PUBLICATIONS

Assmann ("The perception of Speech under Adverse Conditions", p. 250, https://pdfs.semanticscholar.org/f9e9/75030e84f2181b92cac1656f5f796f3c0c3e.pdf).*

(Continued)

*Primary Examiner* — Seong-Ah A Shin

(57) ABSTRACT

Certain example embodiments relate to speech privacy systems and/or associated methods. The techniques described herein disrupt the intelligibility of the perceived speech by, for example, superimposing onto an original speech signal a masking replica of the original speech signal in which portions of it are smeared by a time delay and/or amplitude adjustment, with the time delays and/or amplitude adjustments oscillating over time. In certain example embodiments, smearing of the original signal may be generated in frequency ranges corresponding to formants, consonant sounds, phonemes, and/or other related or non-related information-carrying building blocks of speech. Additionally, or in the alternative, annoying reverberations particular to a room or area in low frequency ranges may be "cut out" of the replica signal, without increasing or substantially increasing perceived loudness.

26 Claims, 16 Drawing Sheets

(51) Int. Cl.
*H04K 3/00* (2006.01)
*G10L 21/16* (2013.01)

(56) References Cited

U.S. PATENT DOCUMENTS

| | | | | |
|---|---|---|---|---|
| 2,159,488 | A | 5/1939 | Parkinson | |
| 2,966,954 | A | 1/1961 | Sabine | |
| 3,229,429 | A | 1/1966 | Conrad | |
| 3,239,973 | A | 3/1966 | Hannes et al. | |
| 3,384,199 | A | 5/1968 | Eckel | |
| 3,621,934 | A | 11/1971 | Thrasher | |
| 3,879,578 | A | 4/1975 | Wildi | |
| 4,059,726 | A | 11/1977 | Watters et al. | |
| 4,098,370 | A | 7/1978 | McGregor | |
| 4,099,027 | A | 7/1978 | Whitten | |
| 4,195,202 | A | 3/1980 | McCalmont | |
| 4,268,717 | A * | 5/1981 | Moore | G10K 15/12 381/63 |
| 4,476,572 | A | 10/1984 | Horrall et al. | |
| 5,024,288 | A | 6/1991 | Shepherd et al. | |
| 5,202,174 | A | 4/1993 | Capaul | |
| 5,368,917 | A | 11/1994 | Rehfeld et al. | |
| 5,438,624 | A | 8/1995 | Lewiner et al. | |
| 5,491,310 | A | 2/1996 | Jen | |
| 5,627,897 | A | 5/1997 | Gagliardini et al. | |
| 5,668,744 | A | 9/1997 | Varadan et al. | |
| 5,724,432 | A | 3/1998 | Bouvet et al. | |
| 5,754,662 | A | 5/1998 | Jolly et al. | |
| 5,997,985 | A | 12/1999 | Clarke | |
| 6,078,673 | A | 6/2000 | Von Flotow et al. | |
| 6,119,807 | A | 9/2000 | Benson, Jr. et al. | |
| 6,483,926 | B1 | 11/2002 | Yamashita et al. | |
| 6,771,791 | B2 | 8/2004 | Shelley | |
| 7,194,094 | B2 | 3/2007 | Horrall | |
| 7,363,227 | B2 | 4/2008 | Mapes-Riordan | |
| 7,460,675 | B2 | 12/2008 | L'Esperance et al. | |
| 7,754,338 | B2 | 7/2010 | Anderson | |
| 7,756,281 | B2 | 7/2010 | Goldstein | |
| 7,761,291 | B2 | 7/2010 | Renevey et al. | |
| 7,763,334 | B2 | 7/2010 | Berkowitz | |
| 7,854,295 | B2 | 12/2010 | Kakuhari | |
| 8,100,225 | B2 | 1/2012 | Bartha | |
| 8,144,882 | B2 | 3/2012 | Christoph et al. | |
| 8,180,067 | B2 | 5/2012 | Soulodre | |
| 8,739,927 | B2 | 6/2014 | Kang | |
| 8,925,678 | B2 | 1/2015 | Tizzoni | |
| 9,186,865 | B2 | 11/2015 | Blanchard et al. | |
| 9,390,702 | B2 | 7/2016 | Mathur | |
| 9,980,041 | B2 | 5/2018 | Kawakami et al. | |
| 2002/0017426 | A1 | 12/2002 | Takahashi et al. | |
| 2003/0048910 | A1 | 3/2003 | Roy et al. | |
| 2003/0091199 | A1 | 5/2003 | Horrall | |
| 2003/0215108 | A1 | 11/2003 | Shelley | |
| 2003/0219133 | A1 | 11/2003 | Horrall et al. | |
| 2004/0057584 | A1 | 3/2004 | Kakuhari et al. | |
| 2004/0102975 | A1 | 5/2004 | Eide | |
| 2004/0125922 | A1 | 7/2004 | Specht | |
| 2004/0189475 | A1 | 9/2004 | Cooper | |
| 2004/0191474 | A1 | 9/2004 | Yamagiwa | |
| 2005/0065778 | A1 | 3/2005 | Mastrianni et al. | |
| 2005/0157891 | A1 | 7/2005 | Johansen | |
| 2006/0009969 | A1 | 1/2006 | L'Esperance | |
| 2006/0072766 | A1 | 4/2006 | Klein et al. | |
| 2006/0109983 | A1 | 5/2006 | Young | |
| 2006/0147051 | A1 | 7/2006 | Smith | |
| 2006/0289229 | A1 | 12/2006 | Yamaguchi | |
| 2007/0291959 | A1 | 12/2007 | Seefeldt | |
| 2008/0002833 | A1 | 1/2008 | Kuster | |
| 2008/0144864 | A1 | 6/2008 | Huon | |
| 2008/0187147 | A1 | 8/2008 | Berner et al. | |
| 2008/0235008 | A1 | 9/2008 | Ito et al. | |
| 2008/0300869 | A1 | 12/2008 | Derkx et al. | |
| 2009/0084627 | A1 | 4/2009 | Tsugihashi | |
| 2009/0316912 | A1 | 12/2009 | De Poortere | |
| 2010/0014683 | A1 | 1/2010 | Maeda | |
| 2010/0028134 | A1 | 2/2010 | Slapak | |
| 2010/0175949 | A1 | 7/2010 | Yamaguchi | |
| 2010/0266138 | A1 | 10/2010 | Sachau et al. | |
| 2011/0093262 | A1 * | 4/2011 | Wittke | G10K 11/178 704/226 |
| 2011/0182438 | A1 | 7/2011 | Koike et al. | |
| 2011/0274283 | A1 | 11/2011 | Athanas | |
| 2012/0197641 | A1 | 8/2012 | Akechi et al. | |
| 2012/0240486 | A1 | 9/2012 | Borroni | |
| 2012/0247867 | A1 | 10/2012 | Yang | |
| 2012/0316869 | A1 * | 12/2012 | Xiang | H04K 1/02 704/226 |
| 2013/0016847 | A1 * | 1/2013 | Steiner | H04K 3/45 381/73.1 |
| 2013/0028443 | A1 | 1/2013 | Pance | |
| 2013/0163772 | A1 | 6/2013 | Kobayashi et al. | |
| 2013/0182866 | A1 * | 7/2013 | Kobayashi | G10K 11/175 381/73.1 |
| 2013/0185061 | A1 * | 7/2013 | Arvanaghi | G10K 11/175 704/201 |
| 2013/0259254 | A1 | 10/2013 | Xiang et al. | |
| 2013/0315413 | A1 | 11/2013 | Yamakawa et al. | |
| 2013/0332157 | A1 | 12/2013 | Lyengar et al. | |
| 2014/0153744 | A1 | 6/2014 | Brannmark | |
| 2014/0200887 | A1 | 7/2014 | Nakadai | |
| 2015/0055790 | A1 | 2/2015 | Kawakami | |
| 2015/0065788 | A1 | 3/2015 | Rapoport | |
| 2015/0104026 | A1 | 4/2015 | Kappus et al. | |
| 2015/0139435 | A1 | 5/2015 | Forrest et al. | |
| 2015/0245137 | A1 | 8/2015 | Sugano | |
| 2015/0341722 | A1 | 11/2015 | Iyengar | |
| 2015/0348530 | A1 | 12/2015 | Findlay | |
| 2016/0241984 | A1 | 8/2016 | De Bruijn | |
| 2016/0269828 | A1 | 9/2016 | Smith et al. | |
| 2016/0365079 | A1 | 12/2016 | Scherrer | |
| 2016/0381453 | A1 | 12/2016 | Ushakov | |
| 2017/0256250 | A1 | 9/2017 | Krasnov | |
| 2017/0360347 | A1 | 12/2017 | Bowles | |
| 2018/0039478 | A1 | 2/2018 | Sung | |
| 2018/0040338 | A1 * | 2/2018 | Schiro | G10L 25/87 |
| 2018/0047126 | A1 | 2/2018 | Falkenstern | |
| 2018/0233161 | A1 | 8/2018 | Kagoshima | |

FOREIGN PATENT DOCUMENTS

| | | |
|---|---|---|
| DE | 10 2014 111365 | 2/2016 |
| DE | 102014111365 | 2/2016 |
| JP | H05 181488 | 7/1993 |
| JP | H08 144390 | 6/1996 |
| JP | 2008-233670 A | 10/2008 |
| JP | 2011-123141 | 6/2011 |
| WO | 2000/047012 | 8/2000 |
| WO | 2009/156928 | 12/2009 |
| WO | 2012/007746 | 1/2012 |
| WO | 2016/116330 | 7/2016 |

OTHER PUBLICATIONS

Bronkhorst ("The Cocktail Party Phenomenon: A Review of Research on Speech Intelligibility in Multiple-Talker Conditions", pp. 1465-1487, ACTA Acustica united with Acustica, Jan. 2000).*

Wikipedia—Sound Masking, retrieved Mar. 2, 2016, 36 pages. https://en.wikipedia.org/wiki/Sound_masking.

U.S. Appl. No. 15/057,890, filed Mar. 1, 2016, Krasnov et al.

U.S. Appl. No. 15/057,842, filed Mar. 1, 2016, Krasnov et al.

U.S. Appl. No. 15/057,867, filed Mar. 1, 2016, Krasnov et al.

Simon Arnfield, "Emotional stress and speech tempo variability." Proc. ESCA/NATO Workshop on Speech Under Stress, Lisbon, Portugal, Sep. 14-15, 1995, 3 pages. http://www.isca-speech.org/archive_open/archive_papers/sus_95/sus5_013.pdf.

Richard M. Warren, "Perceptual Restoration of Missing Speech Sounds," Science, New Series, vol. 167, No. 3917, Jan. 23, 1970, 3 pages. http://web.cse.ohio-state.edu/~dwang/teaching/cse788/papers/Warren70.pdf.

Makio Kashino, "Phonemic Restoration: The Brain Creates Missing Speech Sounds," Acoustical Science and Technology, Jan. 2006, 5

(56) References Cited

OTHER PUBLICATIONS pages. https://www.researchgate.net/publication/252169039_Phonemic_restoration_The_brain_creates_missing_speech_sounds.
R. Carhart et al., "Perceptual Masking of Spondees by Combinations of Talkers," The Journal of Acoustical Society of America, 1975, 2 pages. http://asa.scitation.org/doi/pdf/10.1121/1.2002082.
Yi Hu et al., "Effects of Early and Late Reflections on Intelligibility of Reverberated Speech by Cochlear Implant Listeners," Jan. 2014, 7 pages. https://www.ncbi.nlm.nih.gov/pmc/articles/PMC3874051/.
Michael Rugg et al., "How Does Background Noise Affect our Concentration?" Jan. 2010, 7 pages. https://www.scientificamerican.com/article/ask-the-brains-background-noise/#.
Adelbert W. Bronkhorst, "The Cocktail Party Phenomenon: A Review of Research on Speech Intelligibility in Multiple-Talker Conditions," Acta Acustica United with Acustica, vol. 86, Jan. 2000, 13 pages. https://www.researchgate.net/publication/230739432_The_Cocktail_Party_Phenomenon_A_Review_of_Research_on_Speech_Intelligibility_in_Multiple-Talker_Conditions.
Jungsoo Kim et al., "Workspace Satisfaction: The Privacy-Communication Trade-off in Open-Plan Offices," Journal of Environmental Psychology. UC Berkeley: Center for the Built Environment, Jun. 2013, 22 pages. http://escholarship.org/uc/item/2gq017pb.
Manna Navai et al., "Acoustic Satisfaction in Open-Plan Offices: Review and Recommendation," National Research Council Canada, Institute for Research in Construction, IRC-RR-151, Jul. 17, 2003, 24 pages. https://www.researchgate.net/publication/44063658_Acoustic_Satisfaction_in_Open-Plan_Offices_Review_and_Recommendations.
Forrest et al., "Effects of white noise masking and low pass filtering on speech kinematics," J. Speech Hear. Res. 29, Dec. 1986, pp. 549-562.
U.S. Appl. No. 15/459,273, filed Mar. 15, 2016, Krasnov.
U.S. Appl. No. 15/459,307, filed Mar. 15, 2016, Krasnov.
U.S. Appl. No. 15/459,352, filed Mar. 15, 2016, Krasnov.
Moeller, Retrofitting Sound Masking Improving Speech Privacy and Noise Control in Occupied Spaces, Feb. 2014, 4 pages.
Bao et al, Active Acoustic Control of Noise Transmission Through Double Walls Effects of Mechanical Paths, JSV, Feb. 1998, 4 pages.
Kaiser, Active Control of Sound Transmission through a Double Wall Structure, 2001, 249 pages.
Taylor et al, Sound Masking Systems, Atlas Sound, 2000, 56 pages.
Boothroyd, A., Mulhearn, B., Gong, J., and Ostroff, J., "Effects of spectral smearing on phoneme and word recognition," J. Acoust. Soc. Am. 100, Sep. 1996, 1807-1818.
Childers, D.G. and Wu, K., "Gender recognition from speech. Part II: Fine Analysis," J. Acoust. Soc. Am. 90, Oct. 1991, 1841-1856.
DeLoach, A., "Tuning the cognitive environment: Sound masking with "natural" sounds in open-plan offices," J. Acoust. Soc. Am. 137, Apr. 2015, 2291-2293.
Festen, J.M., "Effects of fluctuating noise and interfering speech on the speech-reception threshold for impared and normal hearing," J. Acoust. Soc. Am. 88, Oct. 1990, 1725-1736.
Festen, J.M., "Contributions of comodulation masking release and temporal resolution to the speech-reception threshold masked by an interfering voice," J. Acoust. Soc. Am. 94, Sep. 1993, 1295-1300.
Plomp, R., "Auditory handicap of hearing impairment and the limited benefit of hearing aids," J. Acoust. Soc. Am. 63, Feb. 1978, 533-549.
Rosen, S. and Fourcin, A., "Frequency Selective and the Perception of Speech," Frequency Selectivity of Hearing, edited by B.C.J. Moore (AP London), (1986), pp. 373-487.
Simpson, A., "Phonetic differences between male and female speech," Language and Linguistics Compass 3/2, Mar. 2009, 621-640.
Ter Keurs, M., Festen, J.M., and Plomp, R., "Effect of spectral envelope smearing on speech reception. I," J. Acoust. Soc. Am. 91, May 1992, 2872-2880.
PCT International Search Report for PCT/US2017/018836 dated May 15, 2017.
Vorlander, Material Data the basic parameters of acoustic material, 2007, 32 pages.
Wenger, Acoustic probem solution, 2000, 15 pages.
HermanMiller, Sound Masking in the Office, 2003, 6 pages.
Arai et al, Effects of suppressing steady state portions of speech on intelligibility in reverberant environments, AST, 2002, 4 pages.
Bolt, Theory of speech masking by reverberation, JASA, Jun. 2005, 2 pages.
UCSC, "Room Modes," May 2, 2016, 4 pages.
Noxon, Coherent and Incoherent Diffusion, Sep. 1990, 10 pages.
Wilson, Rhonda J. "The Loudspeaker—Room Interface—Controlling Excitation of Room Modes", AES Conference May 23, 2003 pp. 1-14.
Ndo, G. et al., "An Hybrid Approach of Low Frequency Room Equalization: Notch Filters based on Common Acoustical Pole Modeling", 2007 15th EP Signal Processing Processing Conference, IEEE, Sep. 3, 2007, pp. 1600-1604.
Green et al.; "A Method of Enhancing Speech Privacy", NOISE-CON; Jun. 12-14, 2017; pp. 479-482.

* cited by examiner

SPEECH PRIVACY SYSTEM AND/OR ASSOCIATED METHOD

CROSS-REFERENCE TO RELATED APPLICATIONS

This application incorporates by reference the entire contents of each of U.S. application Ser. No. 15/057,867 filed on Mar. 1, 2016; U.S. application Ser. No. 15/057,890 filed on Mar. 1, 2016; and U.S. application Ser. No. 15/057,842 filed on Mar. 1, 2016.

TECHNICAL FIELD

Certain example embodiments of this invention relate to speech privacy systems and/or associated methods. More particularly, certain example embodiments of this invention relate to speech privacy systems and/or associated methods that disrupt the intelligibility of speech by, for example, superimposing onto a speech signal a replica of the original speech signal in which portions of it are delayed and/or adjusted in phase and/or adjusted in amplitude, with the time delays and/or amplitude adjustments oscillating over time.

BACKGROUND AND SUMMARY

Protecting speech privacy has become an increasingly important task in modern workplaces. Those who speak would like the content of their speech to be confined to their offices or conference rooms. Unintended listeners, on the other hand, would like not to be disturbed by the unnecessary oral information. Irritating speech from others is also problematic in settings other than offices including, for example, homes, libraries, banks, and/or the like, e.g., where people are often unaware that their speech is disturbing to others.

In fact, there are a number of potential adverse effects elicited by enduring annoying sounds. These adverse effects can range from productivity losses for organizations (e.g., for failure to maintain, and/or interruptions in, concentration) to medical issues for people (e.g., the onset of headaches caused by annoying sounds, irritability, increased heart rate, and/or the like) and even to the urge to seek a new work environment. Misophonia, a learned condition relating to the association of sound with something unpleasant, also happens from time-to-time. Some people suffer from acoustic hyper-vigilance or oversensitivity to certain sounds and intruding speech.

In many settings, sound annoyance oftentimes is related to loudness, abruptness, high pitch and, in the case of speech sounds, the speech content. In many cases, there are certain components in speech or noise that make them particularly disruptive or irritating. With respect to speech content, humans tend, regardless of the volume, to strain to hear what is said, which has been found to subconsciously add to the annoyance. That is, once one is aware of somebody speaking, one oftentimes becomes involuntarily involved, adding a sort of subconscious annoyance.

People oftentimes are irritated by high frequencies (e.g., sounds in the 2,000-4,000 Hz range). These sounds do not need to be of high intensity to be perceived to be loud. In this regard, FIG. 1 is a graph showing perceived human hearing at a constant level, plotting sound pressure level against frequency. As can be seen, the "equal loudness sound curve" in FIG. 1 demonstrates that lower-frequency sounds with high sound pressure levels generally are perceived the same way as higher-frequency sounds with lower sound pressure levels. Typically, irritation increases with volume of the noise.

Sound waves, including speech, propagate primarily in a longitudinal way, by alternating compressions and rarefactions of air. When the waves hit a wall, the distortion of molecules creates pressure on the outside of the wall that, in turn, emanates secondary sound.

It will be appreciated that it would be desirable to design a wall with noise-cancellation, including speech-disrupting properties, for at least some settings. Some construction materials, including glass, are poor sound insulators. At the same time, use of glass is often advantageous, as it provides an excellent visual connectivity between offices and can contribute to the engagement of employees. Thus, it will be appreciated that it would be desirable to design an optically transparent wall with noise-cancellation properties, including speech disrupting properties, for at least some of these settings.

Sound-insulating windows have been known in the art. One mainstream approach involves increasing the Sound Transmission Class (STC) of the wall. STC is an integer rating of how well a wall attenuates sound. It is weighted over 16 frequencies across the range of human hearing. STC can be increased, for example, by using certain spacing in connection with double-pane glass walls in order to destructively resonate sound; increasing the STC of single- or double-pane walls by increasing thickness of the glass, and/or using laminated glass.

Unfortunately, however, these techniques come at a cost. For example, increasing the thickness of single-pane glass allows only modest sound abatement, while adding to the cost. The use of double-pane glass, albeit more effective, typically requires the use of at least two comparatively thick (e.g., 6-12.5 mm) glass sheets. These approaches also typically require high tolerances in the wall construction, and the use of special pliant mechanical connections in order to avoid flanking effects. Glass of such thickness is heavy and expensive, and results in a high installation cost.

Furthermore, double-pane walls typically work well primarily for low-frequency sounds. This can limit their effectiveness to a smaller number of applications such as, for example, to exterior walls to counteract the low-frequency noise of jet and car engines, noise of seaports, railways, etc. At the same time, most speech sounds responsible for both annoyance and speech recognition lie within the 1800+Hz range. It therefore would be desirable to achieve noise cancellation in this higher-frequency range, e.g., in order to help block irritating components and increase speech privacy.

Instead of abating higher-frequency noise, some acoustical solutions focus on sound masking. For instance, sounds of various frequencies may be electronically overlapped through a speaker, so that the extra sound is provided "on top of" the original noise. Sound masking can include Nature sounds ranging from waterfall and rain sounds to fire crackling and thunderstorm sounds. Various types of artificially-generated masking noises such as, for example, white, pink, brown, and other noises, also are used in this regard. A main purpose of these sound-masking techniques involves reducing annoyance of the surrounding noises, and such approaches can indeed obscure the irritation. Unfortunately, however, it also creates additional noise, which some people perceive as irritating in itself. One problem of the above-mentioned sound masking techniques is that their frequencies lie outside the range of frequency of appearance of syllables—the building blocks of speech. See, for example, FIG. 11, discussed in greater detail below, which shows the results of temporal frequency analysis of a normal speech pattern, white noise, and some of Nature's sounds maskers.

Still another example approach for achieving noise cancellation is used in Bose headphones. This approach involves registering incoming noise and creating a counteracting noise that is out of phase with the registered incoming noise. Although it is relatively easy for one to isolate oneself from the environment by wearing headphones, doing so does not prevent the person wearing the headphones from making noises that others find disturbing. That is, even though the person wearing the headphones might have created an isolating environment on an individual level, there is still an issue in creating an isolation area for a group such that others in the group cannot hear what is being said. Additionally, one difficulty of this concept for walls is that it typically only works well on a small area and is suitable primarily for continuous low-frequency sounds (such as, for example, the hum of engines). One reason for this is that only a narrow band of frequencies can be effectively tuned out of phase, and the higher the frequencies, the smaller the aural space of the effective noise cancellation would be.

Thus, it will be appreciated that it would be desirable to provide for techniques that overcome some or all of the above-described and/or other speech-masking problems. For example, it will be appreciated that it would be desirable to provide acoustic techniques that help reduce or otherwise compensate for sounds, including speech, that cause irritation and annoyance to people.

The inventor has recognized that it would be desirable to block the content of the speech from being understood by people around the person speaking in environments such as, for example, open or enclosed office spaces and/or other environments, adjacent offices separated by thin walls with low STC, vehicles (including, for example, commercial and private vehicles such as cars, trucks, trains, airplanes, etc.), bank teller spaces, hospitals, police stations, conference rooms, etc. Indeed, there seemingly is an ever-increasing demand in acoustic privacy, broadly speaking, in modern office spaces.

Current techniques, including the sound-masking and sound-cancelling techniques discussed above, do not target the content of the speech, and are not specifically speech intelligibility disrupting technologies. In fact, noise masking techniques know in the art are, in a fundamental way, not intended to effectively disrupt speech without causing a great deal of additional annoyance. In this regard, the inventor has realized that although the fundamental frequencies of human speech do lie in the same frequency spectrum as some of the available masking noises and/or ranges that can be at least partially cancelled, information-containing blocks have been found to appear at the essentially different frequencies. Information-containing blocks in this context are formants, which represent the energy bursts of sound.

It thus has been recognized that it would be desirable to develop an acoustic-masking technique directed to disrupting the informational content of the speech without causing an additional annoyance. It will be appreciated that masking techniques generally add a certain amount of loudness on top of the original speech. The techniques of certain example embodiments add only a small amount of additional loudness, e.g., because they specifically target essentials cues of speech, such as formants.

In certain example embodiments, a method for disrupting speech intelligibility is provided, the method comprising: receiving, via a microphone, an original speech signal corresponding to original speech; generating an intelligibility-disrupting masking signal comprising smeared cues of the original speech in the original speech signal; and reducing the level of intelligibility of the original speech signal by outputting, through a speaker, the intelligibility-disrupting masking signal comprising the smeared speech cues.

Devices and systems incorporating such functionality also contemplated herein, as are walls incorporating such devices and systems.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Figure 1:
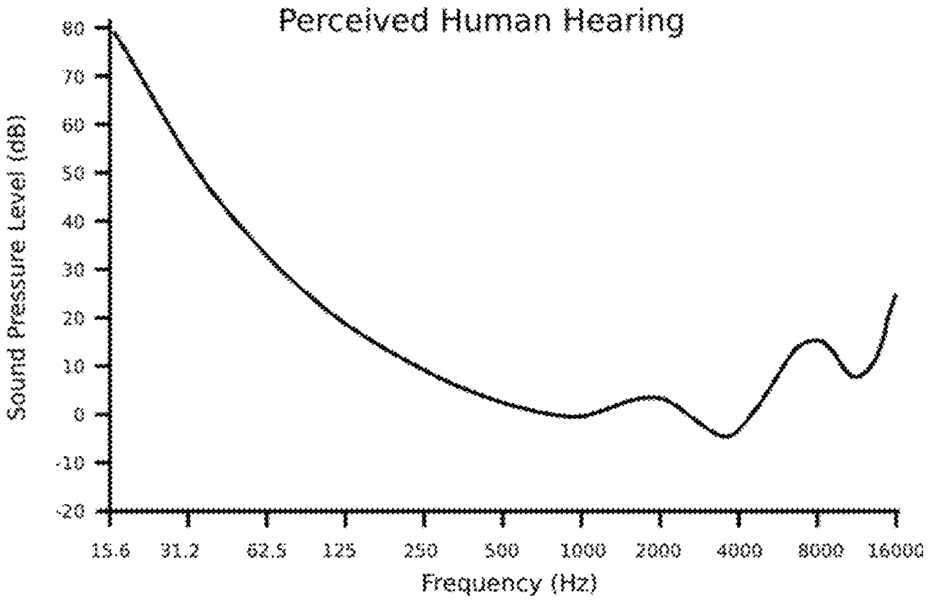
FIG. 1 is a graph showing perceived human hearing at a constant level, plotting sound pressure level against frequency.

Certain example embodiments relate to an acoustic wall assembly that uses active (by electronic means) sound reverberation to achieve speech intelligibility disruption functionality, and/or a method of making and/or using the same. Reverberation, added in an active manner, helps to mask irritating sounds that originate from inside or outside of a room equipped with such a wall assembly. This approach includes, for example, helping to make otherwise potentially disturbing speech be perceived as unintelligible (and thus, less annoying), in certain example embodiments.

Certain example embodiments add noise-masking and speech-disruptive properties to walls with a low STC, advantageously allowing for low-cost, low-weight solutions with speech-privacy qualities. Certain example embodiments may be used in high-STC walls, e.g., as a measure to further improve speech privacy and/or noise masking.

Reverberation sometimes is advantageous when compared to common sound-abating and masking techniques. For example, reverberation in some instances adds only the loudness necessary to disrupt speech or noise. No or only minimal unnecessary additional noise is created in some embodiments. Reverberation also advantageously is not restricted to specific wall assembly dimensions and/or geometries, can work equally well at low and high frequencies, and is "forgiving" with respect to the presence of flanking losses (which otherwise sometimes undermine sound isolation as a result of sound vibrations passing through a structure along an incident path such as, for example, through framing connections, electrical outlets, recessed lights, plumbing pipes, ductwork, and other acoustical gaps). Reverberation also advantageously is resistant to surveillance. Speech masked by white noise sometimes can be easy to decipher (e.g., by removing the additional randomly generated noise from the signal), and reverberation is difficult to decode because there basically is no reference signal (e.g., it is basically self-referenced). Furthermore, reverberation in at least some instances is activated by the original speech signal, and its volume is automatically adjusted to follow the volume of the original signal. An additional benefit of using reverberation relates to its ability to disrupt so-called "beating," which is a potentially irritating infra-sound constructed by two different sound frequencies. Although infra-sound may not always be heard, per se, it can have an adverse subconscious effect. Still further, reverberation may be advantageous from a cost perspective, because it merely disrupts the informational part of speech, rather than trying to completely cover it at an expense of loudness. Indeed, reverberation oftentimes will require less energy than the addition of white noise, for example.

When it comes to speech in particular, certain example embodiments are effective in: disrupting the rhythm of speech, including fundamental frequencies and their harmonics; masking key acoustic cues of overlapping syllables and vowels; eliminating artificially created infra-sound with sub-threshold frequencies that resonate adversely with the brain waves; etc. Certain example embodiments use reverberation in the range of 4-6 Hz, which corresponds to the number of syllables pronounced per second in normal English speech).

Figure 2:
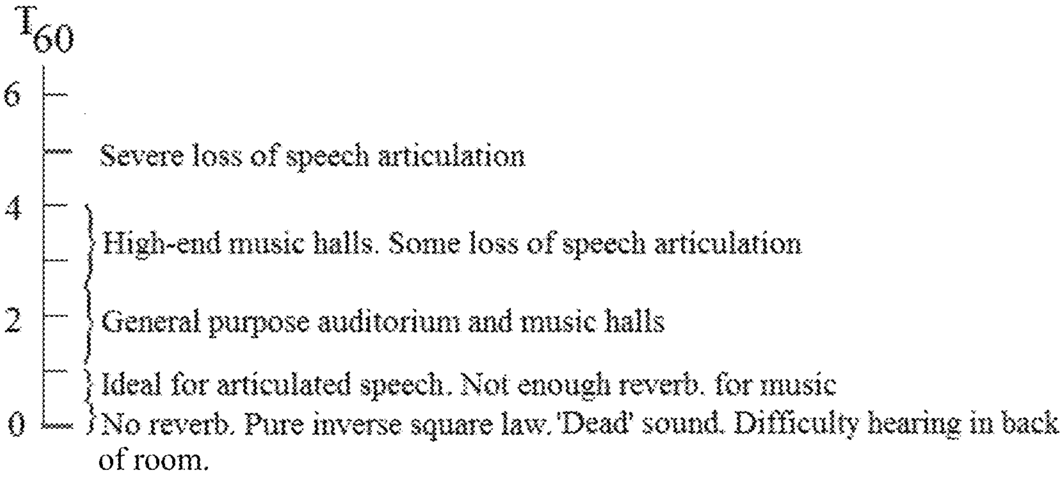
FIG. 2 is a diagram with some examples of what happens with different reverberation times, and showing example applications suitable for different reverberation times.

Reverberation time, $T_{60}$, is one measure associated with reverberation. It represents the time required for sound to decay 60 decibels from its initial level. Rooms with different purposes benefit from different reverberation times. FIG. 2 is a diagram with some examples of what happens with different reverberation times, and showing example applications suitable for different reverberation times. In general, values of $T_{60}$ that are too low (e.g., little to no reverberation) tend to make speech sound "dry," and are preferred in conference rooms, classrooms, and offices, whereas values of $T_{60}$ that are too high (e.g., providing a lot of reverberation) tend to make speech richer and used in music halls, churches, etc. Very high T60 values render speech unintelligible.

$T_{60}$ can be calculated based on the Sabine formula:

$$T_{60} = 0.16\frac{V}{S_e}$$

In this formula, V is the volume and $S_e$ is a combined effective surface area of the room. The $S_e$ of each wall is calculated by multiplying the physical area by the absorption coefficient, which is a textbook value that varies for different materials. The following table provides the sound absorption coefficients of some common interior building materials.

| | 125 Hz | 250 Hz | 500 Hz | 1 kHz | 2 kHz | 4 kHz |
|---|---|---|---|---|---|---|
| Floor Materials | | | | | | |
| Carpet on foam | 0.08 | 0.24 | 0.57 | 0.69 | 0.71 | 0.73 |
| Wall Materials | | | | | | |
| Brick: unglazed | 0.03 | 0.03 | 0.03 | 0.04 | 0.05 | 0.07 |
| Curtain: 10 oz./sq. yd. | 0.03 | 0.04 | 0.11 | 0.17 | 0.24 | 0.35 |
| Fiberglass: 2" | 0.17 | 0.55 | 0.80 | 0.90 | 0.85 | 0.80 |
| Glass: ¼" plate large | 0.18 | 0.06 | 0.04 | 0.03 | 0.02 | 0.02 |
| Polycarbonate | 0.27 | 0.38 | 0.25 | 0.18 | 0.1 | 0.07 |
| Ceiling Materials | | | | | | |
| Acoustic ceiling tiles | 0.70 | 0.66 | 0.72 | 0.92 | 0.88 | 0.75 |
| ⅜" plywood panel | 0.28 | 0.22 | 0.17 | 0.09 | 0.10 | 0.11 |

Figure 3:
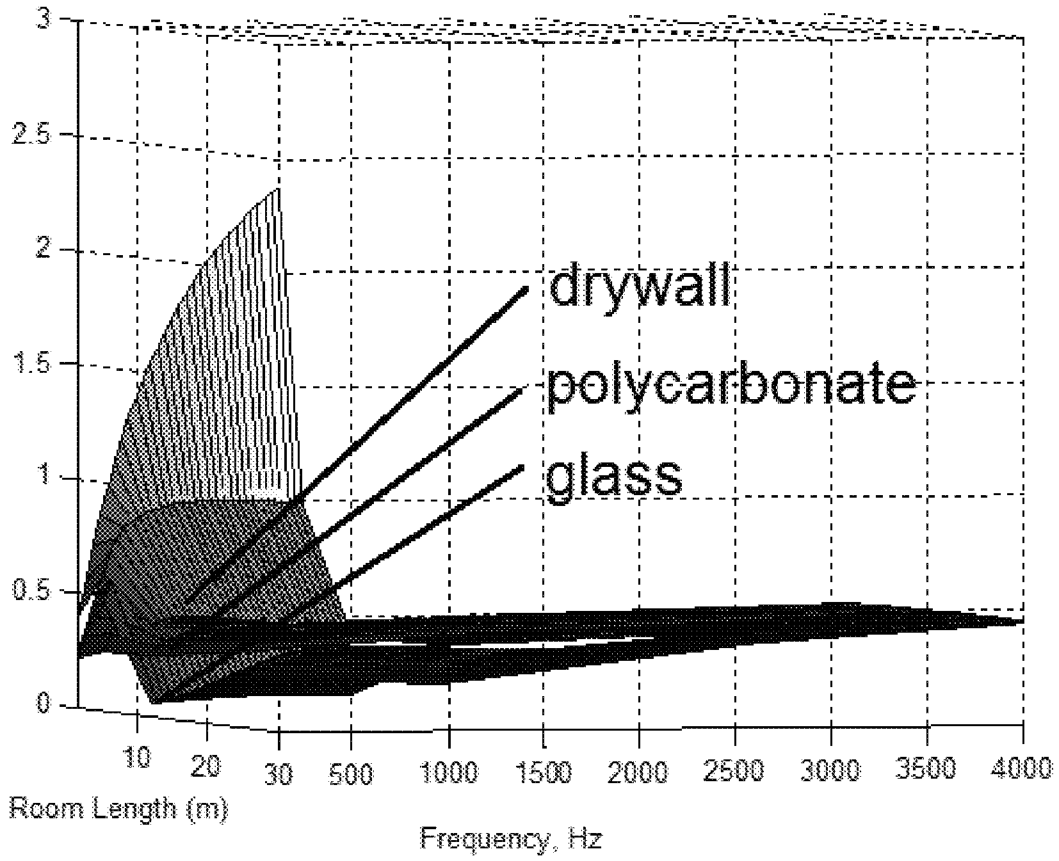
FIG. 3 represents the calculated $T_{60}$ in a room of variable dimensions with walls made out of three different materials, namely, glass, polycarbonate, and drywall.

FIG. 3 represents the calculated $T_{60}$ in a room of variable dimensions with walls made out of three different materials, namely, glass, polycarbonate, and drywall.

Figure 4A:
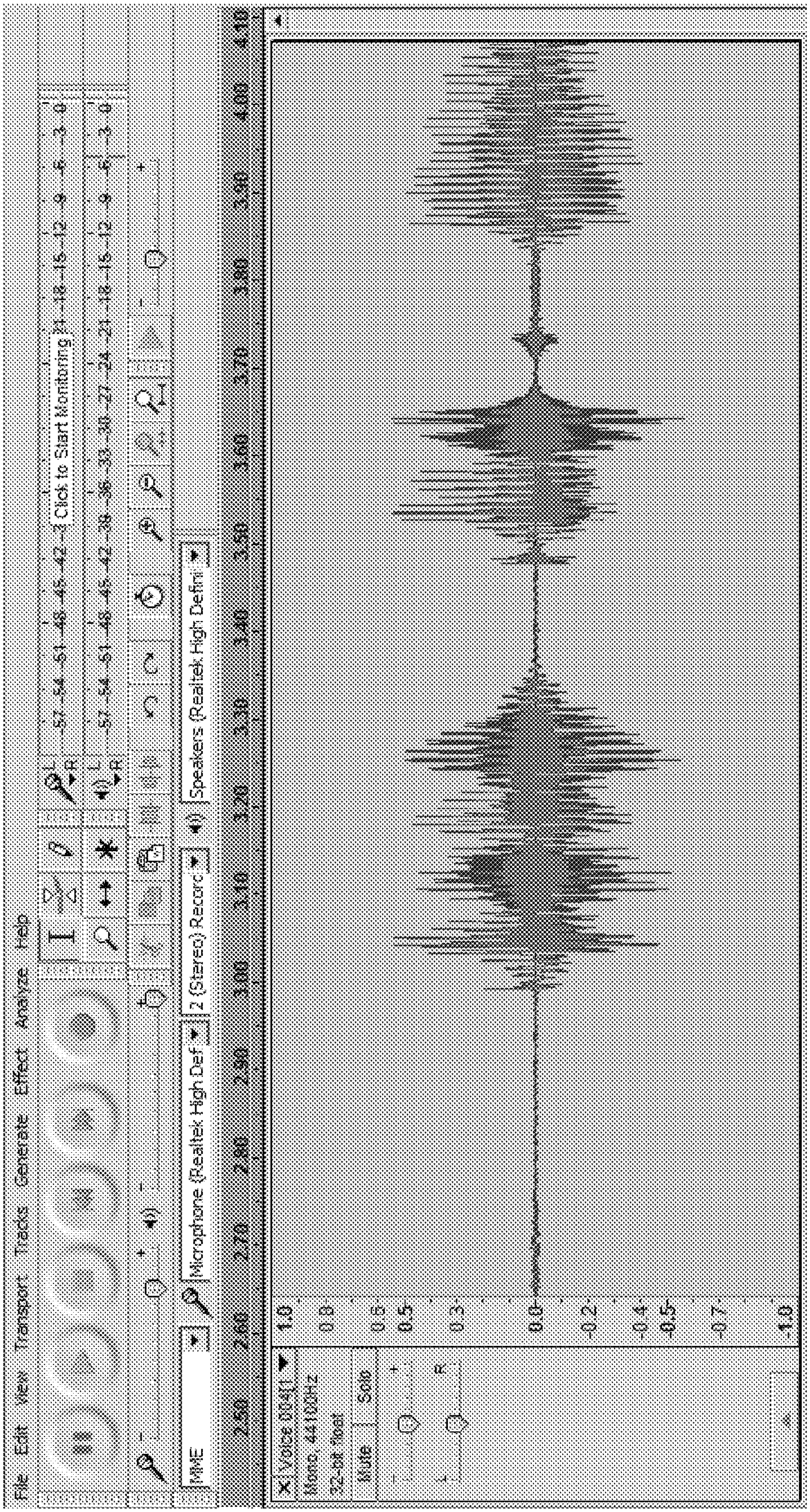
FIGS. 4A-4B provide an example of the effect that reverberation can have.
Figure 4B:
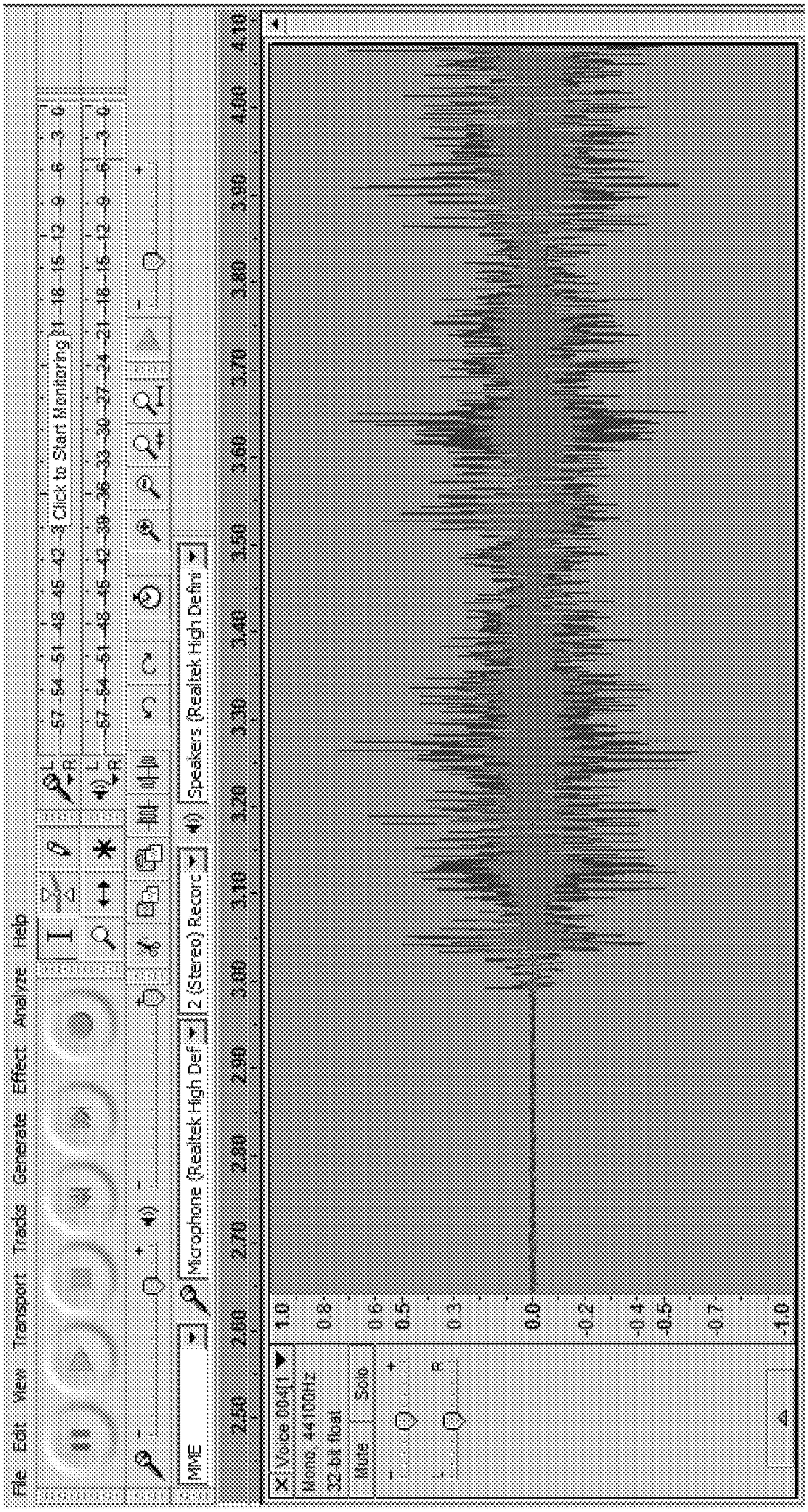

An example of the effect that reverberation can have is presented in FIGS. 4A-4B. FIG. 4A represents an original speech pattern, and FIG. 4B shows an example effect that reverberation can have. As can be seen from FIGS. 4A-4B, reverberation disrupts speech articulation by (among other things) filling in "spaces" between formants, which can be thought of as clusters of vocal energy. Adding signal to these speech building blocks (namely, vowels and especially consonants) and disrupting the space between formants helps to make speech unintelligible and reduce potentially adverse psychoacoustic effects of speech.

As indicated above, certain example embodiments may use active approaches for triggering reverberation to serve in noise-masking and speech intelligibility disrupting roles. As will become clearer from the description below, active approaches may involve electronic, electromechanical, and/or selectively-controllable mechanical apparatus, to disrupt sound waves incident on and/or proximate to a wall assembly or the like. Passive approaches may complement such techniques, in certain example embodiments. In this regard, passive approaches may involve (for example) wall assemblies specifically engineered to trigger reverberation, e.g., through the incorporation of holes in the wall assemblies and/or the attachment or other formation of sound reverberating components therein and/or thereon, using natural properties of the thus-formed wall itself, etc.

Figure 5:
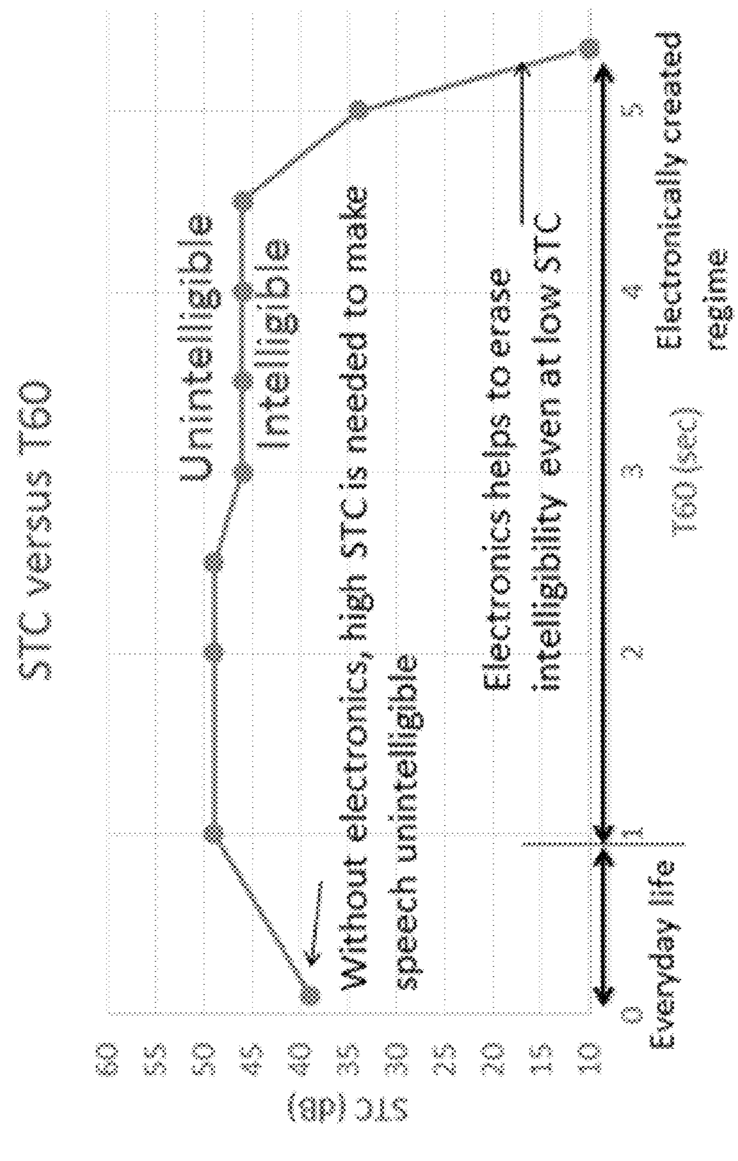
FIG. 5 a graph plotting STC vs. $T_{60}$, further confirming some advantages that result when using an active approach to speech intelligibility disruption, in accordance with certain example embodiments.

Referring once again to FIG. 3, it can be seen that reverberation in walls is primarily noticeable in the low-frequency range. Thus, it may be desirable to use an active approach in order to use reverberation in a high-frequency range to mask irritating sounds and the informational content of speech in some instances. FIG. 5 is a graph plotting STC vs. T60, further confirming some advantages that result when using an active approach to speech intelligibility disruption, in accordance with certain example embodiments. That is, as can be seen in FIG. 5, a high STC can be desirable to make speech and/or the like unintelligible when dealing with a low T60 value. By contrast, an electronically-created regime can help to render the perceived speech unintelligible even at low STC values.

Figure 6A:
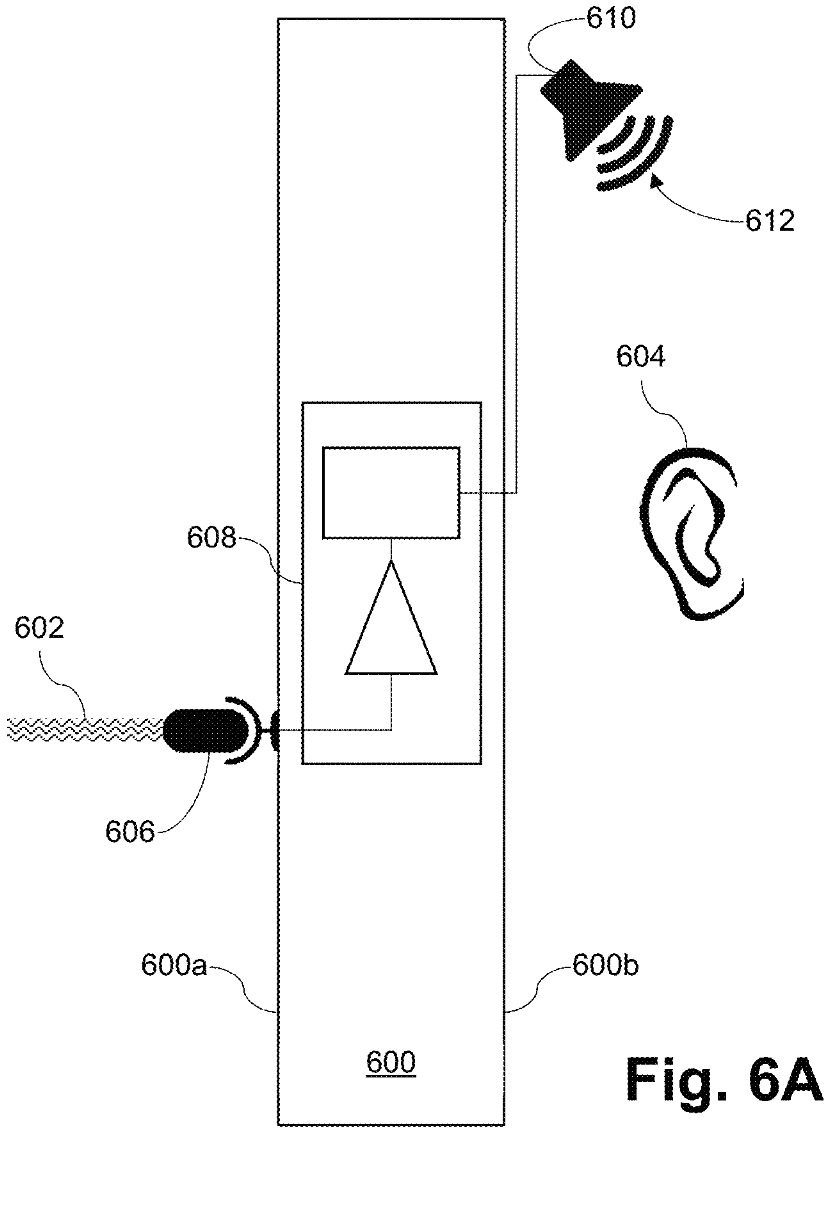
FIGS. 6A-6B are schematic views of acoustic wall assemblies incorporating active noise speech intelligibility disruption approaches in accordance with certain example embodiments.

FIG. 6A is a schematic view of an acoustic wall assembly that incorporates an active speech intelligibility disruption approach in accordance with certain example embodiments. As shown in FIG. 6A, a wall 600 includes outer and inner major surfaces 600*a* and 600*b*. It is desirable in the FIG. 6A embodiment to reduce both the intelligibility and annoyance caused by speech sound 602 relative to the listener(s) 604. Thus, a microphone or other receiving device 606 picks up this sound, and a signal is passed to the sound masking circuit 608 embedded in or otherwise provided in connection with the wall 600 in the broader wall assembly of FIG. 6A. The signal from the microphone 606 may be an analog or digital signal in different example embodiments, and the sound masking circuit 608 may include an analog-digital converter, e.g., in the event that an analog signal that is provided is to be processed digitally. In certain example embodiments, the microphone 606 may be installed within the wall 600, on the same side of the wall as the listener(s) 604, and/or the like.

The sound masking circuit 608 determines whether the signal that is provided to it from the microphone 606 is within one or more predetermined frequency ranges, and/or contains noise with the one or more predetermined frequency ranges therein. A bandpass or other filter that is a part of the sound masking circuit 608 may be used in this regard. One of the one or more predetermined frequency ranges may correspond to speech and/or noise determined to be psychoacoustically disruptive, disturbing, or annoying. One of the one or more predetermined frequency ranges may correspond to the 2800-3200 Hz range, which helps to mask the sounds of most consonants (which may be the most statistically effective manner of masking sounds) and the information-carrying sounds of at least some syllables. One of the one or more predetermined frequency ranges may correspond to the frequency range of formants, as opposed to the fundamental frequency of speech, e.g., as discussed in detail below.

Responsive to the detection of sound waves in the one or more predetermined frequency ranges, the sound masking circuit 608 creates a masking signal and actuates the speaker 610, e.g., to generate sound waves to smear, via a reverberative and/or other effect, noise in a predetermined frequency range that otherwise would pass through the wall. This includes, for example, disrupting the informational part of the perceived speech, thus reducing its intelligibility. Doing so, in turn, helps to selectively mask the detected sound waves as they pass from outside the outside major surface 600*a* of the wall 600 to inside the inside major surface 600*b* of the wall 600, thereby helping to reduce annoyance caused to the listener(s) 604. That is, the reverberation 612 in certain example embodiments helps disrupt perceived speech and/or irritating noises. In certain example embodiments, the noise in essence is concealed in a non-constant, potentially "on demand" or dynamic manner. Advantageously, this effect helps guard against surveillance, as laser microphones (for example) cannot pickup discrete sounds, reverberation is self-referencing and thus harder to decipher, there is no added white noise that can easily be subtracted, etc.

Although the microphone 606 and speaker 610 are shown on opposite sides of the wall 600 in FIG. 6A, it will be appreciated that they may be provided on the same side (e.g., the same side as the listener(s) 604) in certain example embodiments. The reverberation 612 may in some instances be useful in disrupting the intelligibility of sound (including or consisting essentially of speech), regardless of where generated and where located relative to the listener(s) 604 in certain example embodiments. For example, the reverberation 612 may in some instances be useful in disrupting the intelligibility of sound (including or consisting essentially of speech), even if the sound is generated by the listener(s) 604 (e.g., if there are other listeners on the same side of the wall 600 who might otherwise be able to perceive sound from the listener(s) 604).

In addition to or in place of reverberation, certain example embodiments may implement active masking by means of reverse masking. The noise masking enabled by the sound masking circuit 608 may be performed in accordance with an algorithm (e.g., a reverberation algorithm) that uses a technique such as, for example, standard convolution, enhanced convolution, reverse reverberation, delay-controlled reverberation, and/or the like. The sound masking circuit 608 may process incoming noise 602 and control the speaker 610 in accordance with output from the algorithm, in certain example embodiments. In certain example embodiments, the algorithm may change the perceived loudness of incident noise in the time domain. Further details concerning an example algorithm that may be used in connection with certain example embodiments are provided below.

The wall 600 may be formed from any suitable material such as, for example, one or more sheets of drywall, glass, polycarbonate, plaster, and/or the like. In certain example embodiments, the wall or material(s) comprising the wall has/have acoustic absorption coefficients ranging from: 0.03-0.3 at 125 Hz, 0.03-0.6 at 250 Hz, 0.03-0.6 Hz at 500 Hz; 0.03-0.9 at 1000 Hz, 0.02-0.9 at 2000 Hz, and 0.02-0.8 at 4000 Hz. In this regard, FIG. 6A may be thought of as being either a plan view or a cross-sectional view. In the case of the former (i.e., a plan view), the speaker 610 and/or sound masking circuit 608 may be provided above the wall 600 (e.g., in the ceiling and below, for example, an upper slab) or to the side of the wall 600. In certain example embodiments, the sound masking circuit 608 may be connected to a side of the wall 600 but concealed from view (e.g., by being hidden in the ceiling, behind molding, etc.). The same may be true for the microphone 606. The speaker 610 may generate reverberation 612 proximate to the top and/or sides of the wall 600, triggering reverberation therein, thereof, or proximate thereto.

With respect to a cross-sectional view, the outer and inner major surfaces 600*a* and 600*b* may be separate drywall surfaces separated, for example, by metal and/or wooden studs, or the like. The speaker 610 and/or sound masking circuit 608 may be provided above the wall 600 (e.g., in the ceiling and below, for example, an upper slab), to the side of the wall 600, or within the gap between the outer and inner major surfaces 600*a* and 600*b*. Similar to the above, the sound masking circuit 608 may be connected to a side of the wall 600 but concealed from view (e.g., by being hidden in the ceiling, behind molding, within the gap between the outer and inner major surfaces 600*a* and 600*b*, etc.). The same may be true for the microphone 606. The speaker 610 may generate reverberation 612 proximate to the top and/or sides of the wall 600, within the sides of the wall 600, etc., thereby triggering reverberation therein, thereof, or proximate thereto. Thus, in certain example embodiments, the wall 600 may be said to comprise first and second substantially parallel spaced apart substrates (of or including glass and/or the like), with the speaker 610 and the sound masking circuit 608 being located therebetween and/or thereon.

As alluded to above, the wall may be of or include glass. That is, certain example embodiments may be directed to a glass wall used in connection with an acoustic wall assembly. The glass wall may comprise, one, two, three, or another number of sheets of glass. The glass may be regular float, heat-strengthened, tempered, and/or laminated glass. In certain example embodiments, the wall may be of or include an insulated glass (IG) unit, a vacuum insulated glass (VIG) unit, and/or the like. An IG unit may include first and second substantially parallel spaced apart substrates, with an edge seal formed around peripheral edges, and with the cavity between the substrates optionally being filled with an inert gas (e.g., Ar, Xe, and/or the like) with or without air. A VIG unit may include first and second substantially parallel spaced apart substrates, with an edge seal formed around peripheral edges, and spacers, with the cavity between the substrates being evacuated to a pressure less than atmospheric. Framing may be provided around the IG unit and/or the VIG unit in some instances, and that framing may be a part of the acoustic wall assembly. In certain example embodiments, other transparent materials may be used. In certain example embodiments, the naturally high sound-reflection coefficient of glass may be advantageous, e.g., when triggering reverberation and/or other noise masking effects.

Figure 6B:
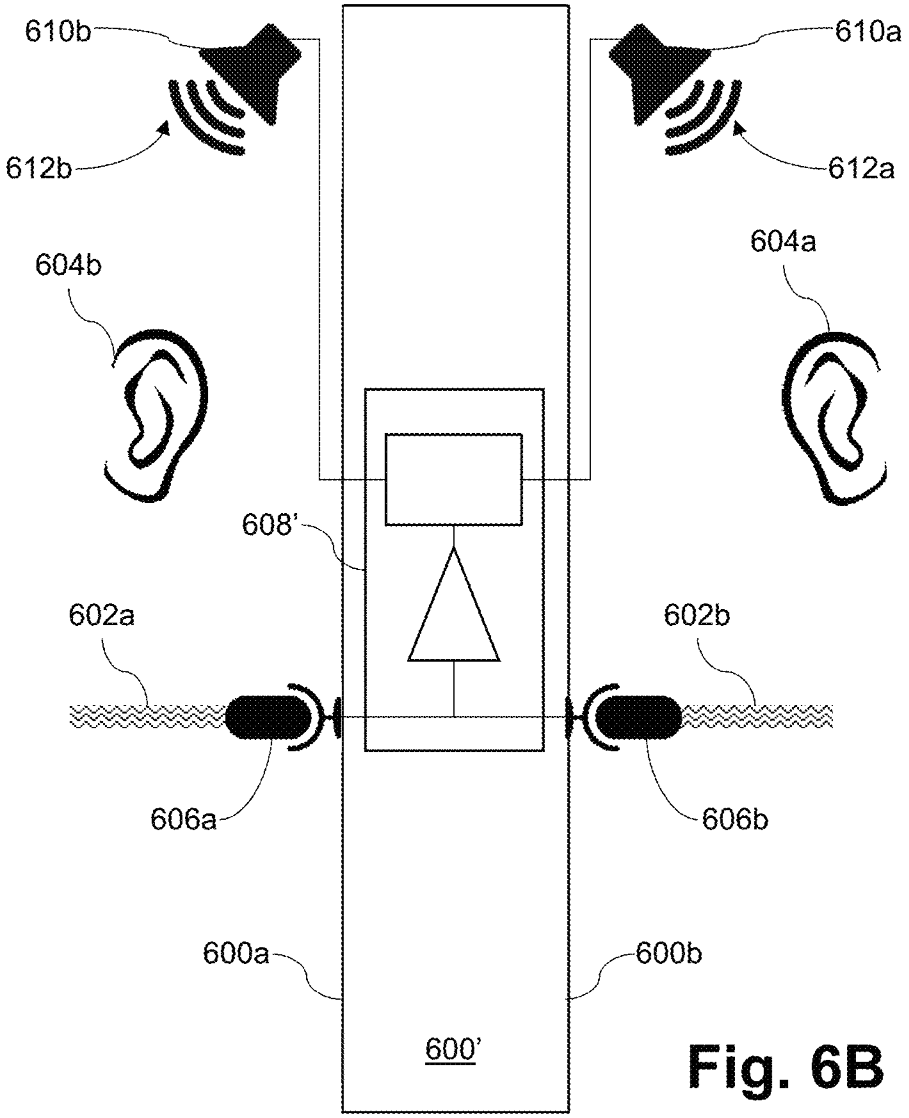

FIG. 6B is similar to FIG. 6A, except that first and second microphones 606*a* and 606*b* are provided so that incident noise 602*a* and 602*b* can be registered and compensated for via first and/or second speakers 610*a* and 610*b*, thereby reducing annoyance to listeners 604*a* and 604*b*, on both sides of the wall 600'. In certain example embodiments, the first and second speakers 610*a* and 610*b* can be controlled independently of one another, e.g., to output different reverberations 612*a* and 612*b*, to output the same reverberative effects at different loudness levels, to have the first speaker 610*a* responsive to sound received from the first microphone 606*a* while the second speaker 610*b* remains off and/or does not respond to incident noise 602*a* and vice versa, etc. In certain example embodiments, the first and second speakers 610*a* and 610*b* can be controlled to work together, e.g., to output the same reverberative effect. As indicated above, in certain example embodiments, the sound masking circuit 608' may trigger the same or different actions with respect to the speakers 610*a* and 610*b*, e.g., based on which side of the wall 600' the noise comes from. In this regard, the sound masking circuit 608' may be able to determine which side of the wall 600' the sound is coming from, e.g., based on intensity and/or the like. The effectiveness of the reverberation 612*a* and 612*b* may be picked up by the other microphone and fed back into the sound masking circuit 608', e.g., to improve the noise masking effects. In different embodiments, one or both of the first and second microphones 606*a* and 606*b* may be provided on inner or outer surfaces of the wall 600'. In certain example embodiments, one of the first and second microphones 606*a* and 606*b* may be formed on an outer surface of the wall 600', and the other of the first and second microphones 606*a* and 606*b* may be formed on an inner surface of the wall 600. In different embodiments, one or both of the first and second speakers 610*a* and 610*b* may be provided on inner or outer surfaces of the wall 600'. In certain example embodiments, one of the first and second speakers 610*a* and 610*b* may be formed on an outer surface of the wall 600', and the other of the speakers 610*a* and 610*b* may be formed on an inner surface of the wall 600. In the FIG. 6B example, reverberation may be said to work actively "in both directions" (although it will be appreciated that it may be possible to realize the same or similar functionality in connection with a single microphone in some cases).

Figure 7:
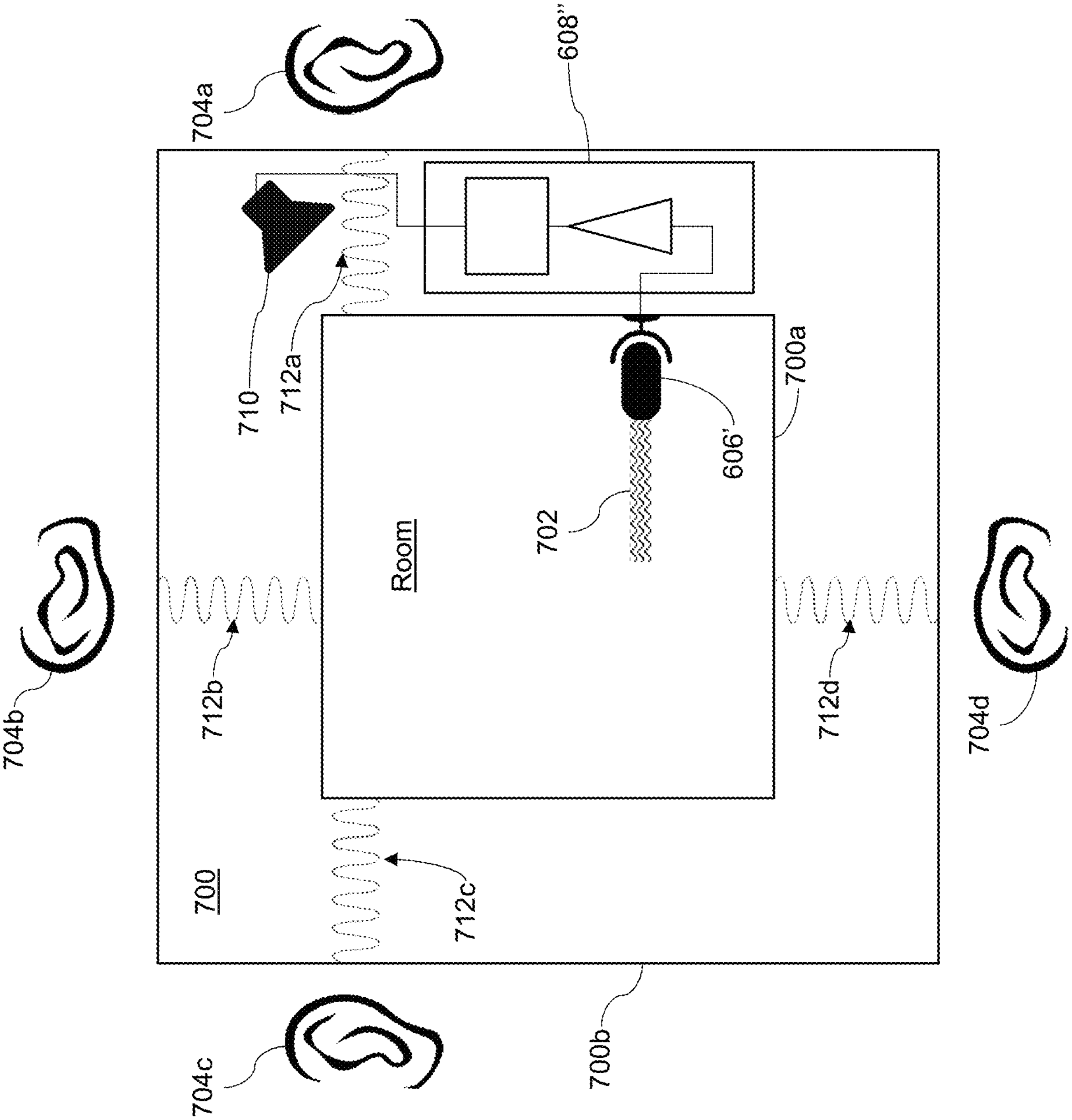
FIG. 7 is a schematic view of another acoustic wall assembly incorporating an active speech intelligibility disruption approach in accordance with certain example embodiments.

FIG. 7 is a schematic view of another acoustic wall assembly incorporating an active speech intelligibility disruption approach in accordance with certain example embodiments. FIG. 7 shows a wall 700 formed outside of a "quiet" or "secure" room. Noise 702 from inside the room is detected by microphone 606'. The sound masking circuit 608" receives signals from the microphone 606' and triggers the speaker 710, which triggers reverberation 712*a*-712*d* in, on, or proximate to the wall 700. The reverberation 712*a*-712*d* is substantially uniform throughout the entire wall 700 in certain example embodiments, so that listeners 704*a*-704*d* around the room (and around the wall 700) cannot perceive sounds and/or annoyance from within. It will be appreciated that the FIG. 7 example may be modified so as to include one or more microphones inside of the room in certain example embodiments. Additionally, or in the alternative, it will be appreciated that the FIG. 7 example may be modified so as to include one or more microphones so as to detect and compensate for sounds originating from outside of the room, e.g., in a manner similar to that described in connection with FIG. 6B. One or more microphones provided to receive sounds originating from outside of the room, regardless of their placement, may be useful in turning FIG. 7 into a private or quiet room, where sounds from the outside are compensated for and masked.

In certain embodiments, one or more speakers may be located outside the wall 700. For instance, speakers may be located on one, two, or more sides of the wall 700, e.g., in or proximate to areas where some or all of listener(s) 704*a*-704*d* may be located, e.g., to mask the noise, disrupt the intelligibility of speech, etc. In such cases, reverberative effects 712*a*-712*b* and/or the like may be generated outside the wall 700. In addition, or in the alternative, one or more speakers may be located in the room to disrupt the sound therein, e.g., if potentially disruptive sound is generated in the room, outside the room, or both inside and outside the room.

Figure 8A:
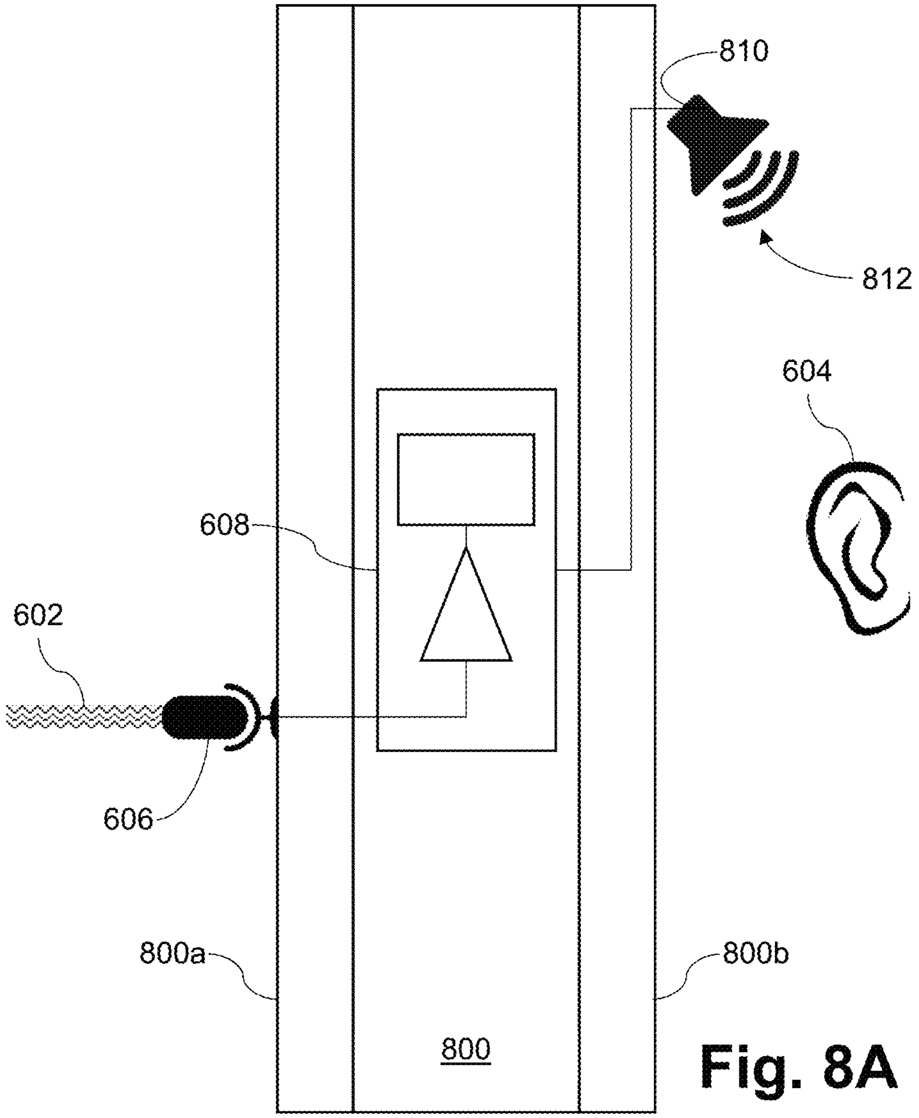
FIGS. 8A-8B are schematic views of acoustic wall assemblies incorporating active speech intelligibility disruption approaches usable in connection with two walls, in accordance with certain example embodiments.
Figure 8B:
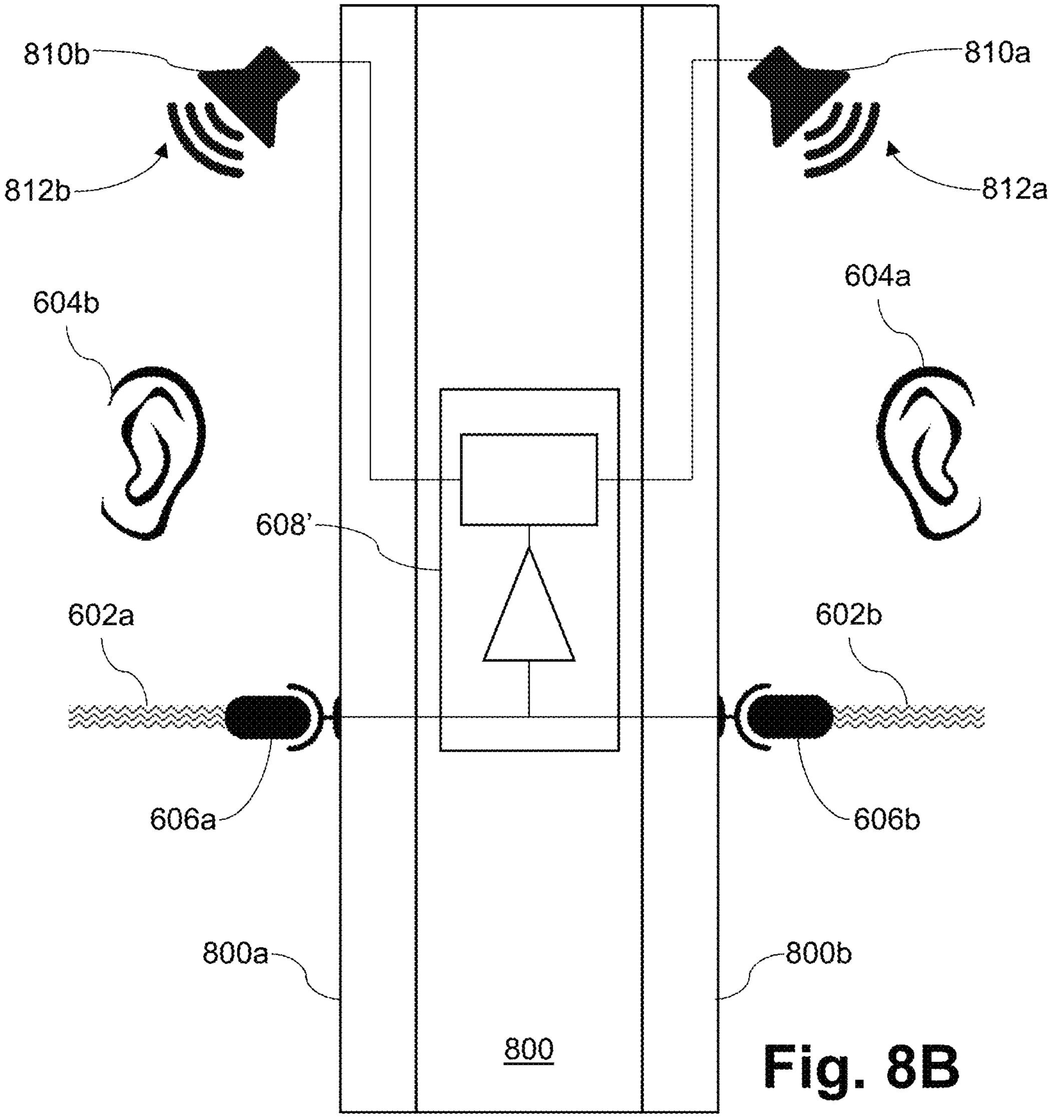

FIGS. 8A-8B are schematic views of acoustic wall assemblies incorporating active speech intelligibility disruption approaches usable in connection with two walls, in accordance with certain example embodiments. FIGS. 8A-8B are similar to FIGS. 6A-6B. However, rather than having outer and inner surfaces of a single wall, outer and inner walls 800*a* and 800*b* are provided. The noise masking circuit 608" and/or the speaker 810 may be placed within the cavity 800 defined by the outer and inner walls 800*a* and 800*b*, and they may cooperate to create reverberation 812 in, on, or proximate to the cavity 800. In certain example embodiments, the speaker 810 may be located proximate to the listener(s) 604, e.g., as shown in FIG. 8A. Similarly, in certain example embodiments, the speakers 810*a*-810*b* may be located proximate to the listener(s) 604*a*-604*b* to create reverberative effects 812*a* and 812*b*, e.g., as shown in FIG. 8B. The modifications (including positional relationships and/or functionality of the sound control circuits and speakers) discussed above in connection with FIGS. 6A-6B also may be made in connection with FIGS. 8A-8B.

It is believed that a wall's lateral dimensions may mostly affect the fundamental spectral regions of speech and their lower harmonics, while the distance between the two sheets of a wall primarily will affect high-frequency components and their higher harmonics. An example embodiment of a glass wall has dimensions 10 ft.×12 ft., with air spacing between two sheets of glass preferably in the range of 1-20 cm, more preferably in the range of 7-17 cm, and an example separation of 10 cm.

Figure 9:
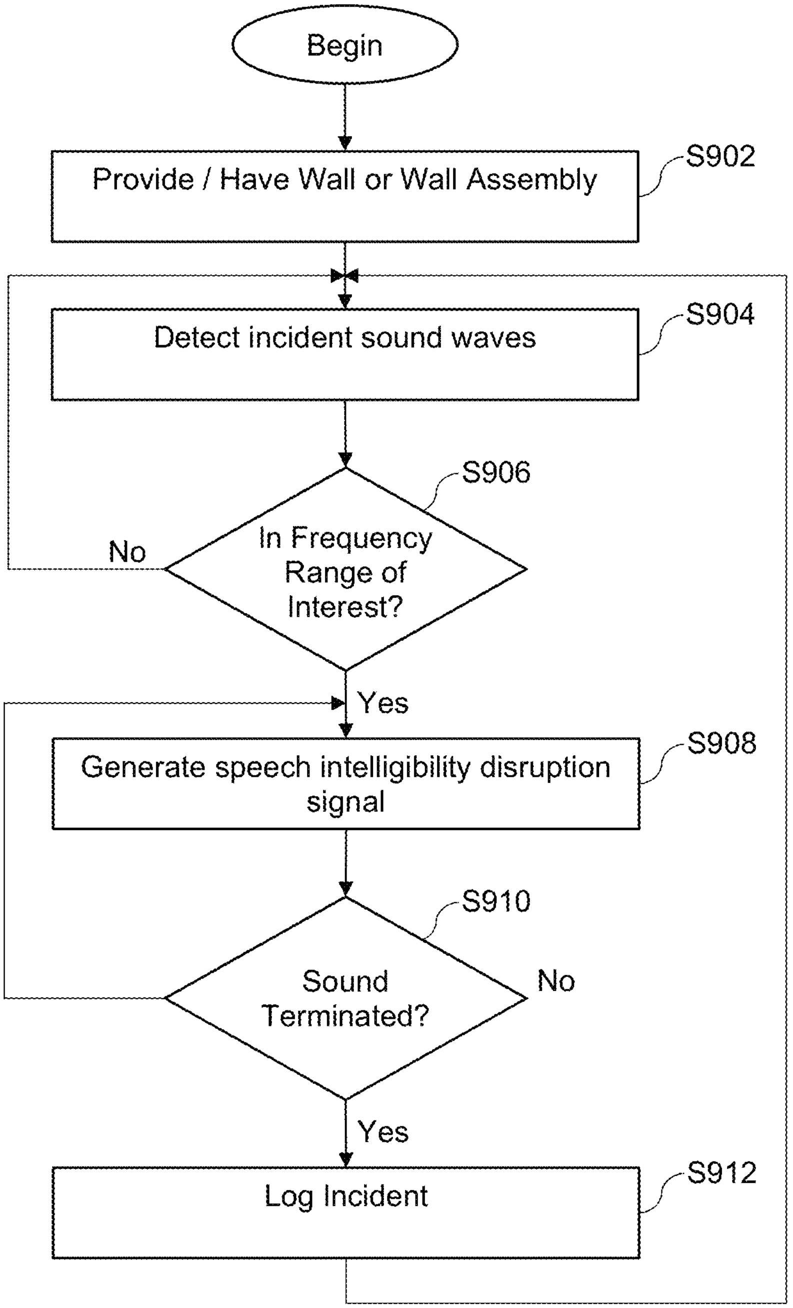
FIG. 9 is a flowchart showing an example approach for active speech intelligibility disruption, which may be used in connection with certain example embodiments.

FIG. 9 is a flowchart showing an example approach for active speech intelligibility disruption, which may be used in connection with certain example embodiments. FIG. 9 assumes that a wall or wall assembly is already provided (step S902). Incident sound waves are detected (step S904). If the detected sound waves are not in or do not include a frequency range of interest (as determined in step S906), then the process simply returns to step S904 and waits for further incident sound waves to be detected. On the other hand, if the detected sound waves are in or include a frequency range of interest (as determined in step S906), a speaker is used to generate a speech intelligibility disruption signal, e.g., in accordance with the example algorithms discussed in greater detail below (step S908). This behavior thus provides for dynamic or "on-demand" masking of noises, including the disruption of speech intelligibility, e.g., through a system that is not always "on." If the sound is not terminated (as determined in step S910), then the process returns to step S908 and the speech intelligibility disruption signal is still generated. On the other hand, if the sound is terminated, then information about the incident may be logged (step S912), and the process may return to step S904 and wait for further incident sound waves to be detected.

The logging of step S912 may include, for example, creation of a record in a data file stored to a non-transitory computer readable storage medium and/or the like (e.g., a flash memory, a USB drive, RAM, etc.). The record may include a timestamp indicating the start and stop times of the event, as well as a location identifier (e.g., specifying the wall at which the sound was detected for instance in the event that there are multiple walls implementing the technology disclosed herein, the microphone that detected the sound for instance in the event that there are multiple microphones in a given wall, etc.). Information about the frequency range(s) and/or signals detected and/or generated may be stored to the record, as well. In certain example embodiments, circuitry may store a digital or other representation of the detected and/or generated sound, e.g., in the record or in an associated data file. As a result, speech or other noises may be recorded, potentially with entire conversations being captured and archived for potential subsequent analysis. For instance, the sound masking circuit (for example) may be used as a recording device (e.g., like a security camera, eavesdropping device, sound statistics monitoring device, and/or the like). In certain example embodiments, information may be stored locally and/or transmitted to a remote computer terminal or the like for potential follow-up action such as, for example, playback of noise events and/or conversations, analysis of same (e.g., to help reveal what types of noises were recorded most, what time of day is the noisiest, who makes the most kinds of different noises, etc.). Transmission may be accomplished by removing physical media (such as a flash drive, USB drive, and/or the like), through a wired connection (e.g., including transmissions over a serial, USB, Ethernet, or other cable), wirelessly (e.g., by Wi-Fi, Bluetooth, over the Internet, and/or other like), etc. Information may be transmitted periodically and/or on-demand in different example embodiments.

In certain example embodiments, the sound masking circuit may be programmed to determine whether incident noise corresponds to a known pattern or type. For example, although annoying, alarm sounds, sirens, and/or the like, may be detected by the sound masking circuit and allowed to go through the wall assembly for safety, informational, and/or other purposes.

In certain example embodiments, the sound masking circuit may be programmed to operate as both a sound (e.g., speech) disrupter (e.g., through the use of reverberation and/or the like), as well as a sound sweetener. With respect to the latter, the sound masking circuit may generate reverberative and/or pleasant sounds to help mask potentially annoying noises and/or disrupt the intelligibility of speech. Pleasant sounds may be Nature sounds (e.g., the sound of the ocean, thunder, rain, waterfalls, etc.), sounds of animals (e.g., dolphins), soothing music, and/or the like. These sounds may be stored to a data store accessible by the sound masking circuit. When appropriate (e.g., when triggering reverberation as described above), the sound masking circuit may retrieve the sound sweetener and provide it as output to a speaker or the like (which may be, for example, the same or different speaker as is used as the air pump in certain example embodiments).

It will be appreciated that passive approaches to noise disruption and/or cancellation may be used in certain example embodiments, e.g., as the wall itself may be structured to serve as a reverberation-inducing resonator that involves acoustic contrast. This may be accomplished by having one or more (and preferably two or more) openings, slits, and/or the like, formed in the acoustic wall assembly, thereby using natural properties of the wall itself to create reverberative effects of a desired type. These features may be formed on one side of the acoustic wall assembly, adding to the acoustics of the wall assembly directional properties. For example, at least one opening may be made in the outside pane of a double-pane wall in order to make the effect directional, and so that the effect of reverberation is more pronounced outside of the wall. As another example, at least one opening may be made in the inside pane of the double-pane wall. This may be advantageous for some applications, like music halls, which may benefit from additional sound reverberation that makes sounds seem richer.

In certain example embodiments, additional reverberating elements may be affixed to a wall. The sound-masking reverberation-inducing element(s) may be provided in a direct contact with a single or partial wall, so the wall can act as a sound source in certain example embodiments. In certain example embodiments, the sound-masking reverberation-inducing element(s) may be provided between the walls in a wall assembly. Sound masking advantageously results in an increased noise/signal contrast, which makes speech perceived behind a single or partial wall less comprehensible and irritating sounds less annoying.

In certain example embodiments, a first set of features may be formed in and/or on an inner pane and a second set of features may be formed in and/or on an outer pane, e.g., keeping some annoying or disruptive sounds out and improving the acoustics "on the inside." In certain example embodiments, multiple sets of features may be formed in and/or on one or both panes of a two-pane wall assembly, with each set of features targeting a different range to be eliminated and/or emphasized.

Other natural properties of the wall assembly (including size, space between adjacent upright walls, etc.) also may be selected to trigger desirable reverberative effects, e.g., as described above.

As alluded to above, it will be appreciated that these more passive techniques may be used in addition to the active techniques discussed above, e.g., with single- or two-wall acoustic wall assemblies.

The wall assembly thus may be made in the manner of a sound resonator with specifically designed fundamental resonant frequencies. As above, any suitable material may be used in constructing the walls. For example, because glass is a naturally good resonator, certain example embodiments are able to make use of a variety of resonant harmonics, which are the integer multiples of the fundamental frequency. Regardless of the material, tailoring of the incoming sound via the features may help to disrupt the frequency ranges of the speech and noise in order to make it unintelligible and/or less annoying. For example, it is possible to target those frequency ranges associated with consonants or formants when dealing with speech, etc. Moreover, because such a wall assembly is designed for selective sound disruption, it is possible in certain example embodiments to use thin glass and longer-lasting rigid joints in the wall assembly. This construction advantageously may make the entire design more solid and reliable. When glass is used, high tolerances may be desirable in order to help maximize the effectiveness of sound resonating properties by avoiding leakage, etc.

The walls described herein may be partial walls, e.g., walls that leave open space between separated areas. That is, the acoustic walls and acoustic wall assemblies may be full-height or partial-height in different instances. Single or double panel walls also may be used. Furthermore, although certain example embodiments have been described in connection with walls and/or rooms, it will be appreciated that the techniques described herein may be used in connection with more general areas where there are no or fewer defining partitions or structurally-defined breaks (e.g., in hospital rooms where curtains separate two patient areas, in lobbies, between the front and back seats of a car, between different rows or areas of an airplane, etc.).

Although passive or active (e.g., computer-generated) reverberation has been used by the assignee to reduce perceived speech intelligibility, it has been found that further improvements are still possible. For example, the human brain is adapted to deal with echoing sounds by giving a priority to the early-arrival signal. In addition, so-called phonemic restoration is known to help the brain restore the information of missing or overlapped sounds. These two phenomena sometimes filter out the identical time-delayed replicas and preserve the intelligibility of an original speech signal. This in turn can compromise the effectiveness of a straightforward reverberation. In the example embodiments described below, another potentially more effective method of disrupting the intelligibility and reducing the annoyance of the perceived speech that takes into account these issues is presented.

Referring once again to step S908 in FIG. 9 and how speech intelligibility disrupting frequencies can be generated, certain example embodiments use a dynamic approach with respect to the masking signal, which is applied on top of the original speech. This approach uses one or a combination of any of the following approaches: (1) constant time delay, (2) time delay varying in time (temporal phasing), (3) amplitude modulation, and (4) spectral filtering. The contribution of these effects can be tuned, depending on specific needs or desires. For example, amplitude increase changes can be kept to a minimum in environments where there is expected to be a certain level of quiet and calm (e.g., hospital recovery rooms, etc.), whereas amplitude increase changes can be greater in areas where there is expected to be a lot of noise (e.g., a hospital waiting room, a police station's "bullpen," etc.).

The above-mentioned approach has been found to produce a robust speech disruption. However, a noticeable increase in the perceived sound loudness may sometimes occur, and listeners may experience annoyance from the increased loudness. Thus, it will be appreciated that it would be desirable to further improve the technique to disrupt the original speech without significantly adding to its loudness and potential annoyance.

Humans tend to interpret replica sounds (as long as they are similar in shape) as part of the original sound, thus effectively ignoring the informational content and only focusing on increased loudness. This is known as the precedence effect. However, the replica signal can be further modified to disrupt the informational content and help reduce the impact of the precedence effect. Certain example embodiments therefore improve upon the technique described above by selectively disrupting the masking speech signal. As will be clearer from the below, this selective disruption may take place in connection with formants, phonemes, consonant sounds, and/or other building blocks of speech.

Certain example embodiments use a frequency of oscillation of the reverberation delay in the range of several Hertz. This range is advantageous because it corresponds to the number of syllables per second in a normal English speech. As a result, certain example embodiments enable speech intelligibility to be greatly disrupted without adding a significant amount of noise. That is, it has been recognized that the information-carrying frequency of the speech is in the different frequency range than the "annoyance" portion, so targeting the former allows the speech-content disruption to take place at a low expense of the additional loudness caused by acoustic masking.

In certain example embodiments, the speech intelligibility disrupting masking signal may take the general pattern of the original speech signal. In certain example embodiments, the masking signal may be delayed with respect to the original signal, and/or multiple prerecorded voices may be added to the speech intelligibility disrupting signal (e.g., to create the perception of crowd noise). In certain example embodiments, other sounds (such as, for example, the above-described and/or other Nature sounds, sound "sweeteners," and/or the like) may be added to further improve the speech intelligibility disruption effect.

Figure 10:
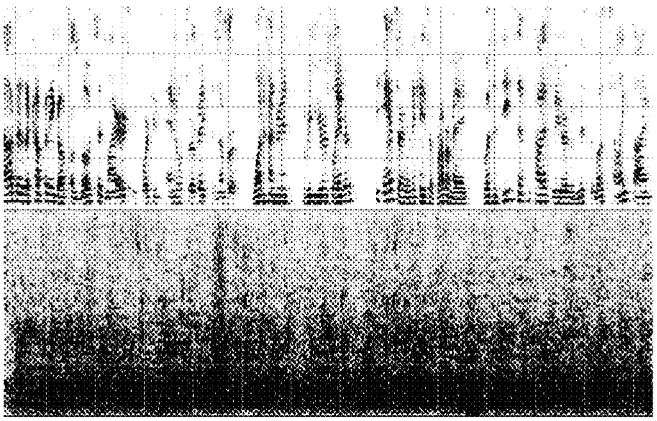
FIG. 10 shows formant frequencies for single- and multiple-voice speech, at its top and bottom portions, respectively.

FIG. 10 shows formant frequencies for single- and multiple-voice speech, at its top and bottom portions, respectively. It will be appreciated that the lower graph may be added on top of detected speech in certain example embodiments, e.g., to disrupt the intelligibility of speech, etc.

Figure 11:
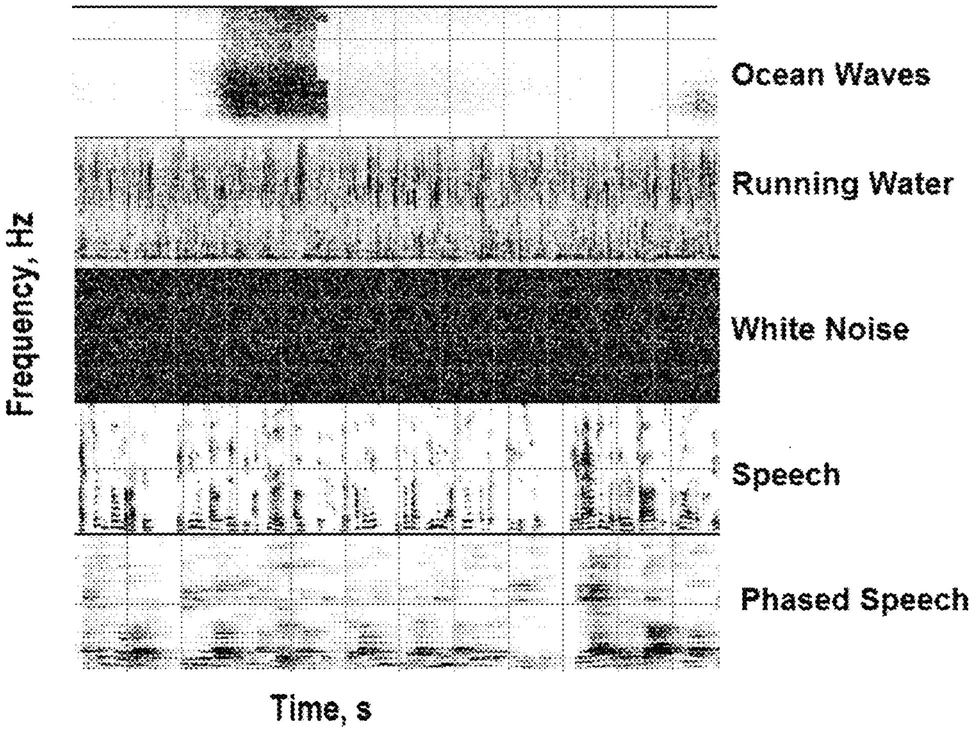
FIG. 11 shows formant frequencies for different types of sounds, including different nature sounds and speech different sounds.

FIG. 11 shows formant frequencies for different types of sounds, including different Nature sounds and speech different sounds, and the former may be added to the latter as sound sweeteners or the like, e.g., as noted above.

In operation, a method for disrupting speech intelligibility comprises receiving, via a microphone or other listening device, an original speech signal. The original speech signal includes a plurality of formants (the building-blocks of speech intelligibility) and has a certain basic level of intelligibility perceivable by a human listener. The original speech signal is processed (e.g., using a hardware processor or other control circuitry) to identify frequency ranges associated with the formants that comprise the original speech signal. Various parameters then may be used to in essence alter the speech signal and make the intelligibility-disrupting masking signal. For instance, an intelligibility-disrupting signal may be generated to comprise intelligibility-disrupting formants that are in the same frequency range(s) as the formants that comprise the original speech signal, and the level of intelligibility of the resultant perceived speech can be reduced by outputting, through a speaker, the intelligibility-disrupting signal comprising the generated intelligibility-disrupting formants. The intelligibility-disrupting formants are generated within a frequency range of 0.02-8 Hz in some instances. In some cases, the intelligibility-disrupting formants are generated with a frequency of 2-6 Hz (e.g., 4 Hz).

In certain example embodiments, the intelligibility-disrupting signal may be time delayed relative to the original speech signal, e.g., such that the intelligibility-disrupting masking signal follows the general pattern of the original speech signal, is a time-delayed replica of the original speech signal, a time-phased replica of the original signal, an amplitude-modulated version of the original speech signal, and/or the like. A constant time delay range of 0-150 ms is preferred, with 40-120 ms being more preferred, and 60-110 ms being more preferred. An example delay of 80 ms may be optimal in some instances and in other instances, delays that average 80 ms may be optimal. In certain example embodiments, a dynamic reverberation additionally or alternatively may be used, e.g., such that the time delay oscillates in time.

Gain relative to the original speech signal may be adjusted, additionally or alternatively, in certain example embodiments. Furthermore, the gain can be modulated in time, as well. For example, the intelligibility-disrupting masking signal may be generated such that loudness of the intelligibility-disrupting signal oscillates in time. Preferably, the gain (corresponding to the modulated intelligibility-disrupting signal summed with the original speech signal) is not too great, as this could create negative psychoacoustic effects, e.g., by creating too much loudness or disruption. In certain example embodiments, the gain applied is up to double the corresponding original speech signal. In certain example embodiments, the gain is, or averages to, 0.05-0.25%, more preferably 0.10-0.20%, with an example being 0.15%.

In certain example embodiments, the time delay and/or amplitude adjustment may be modulated at a given frequency or given frequencies. For example, the time delay and/or amplitude adjustment may be modulated at an oscillation frequency of, or averaging to, 1-10 Hz, more preferably 2-6 Hz, and 4 Hz as an example. It will be appreciated that the modulation may be the same or different for the time delay and the amplitude adjustment in different example embodiments. The delay and/or amplitude modulation may be provided in accordance with one or more algorithms in certain example embodiments. In certain example embodiments, the delay and/or amplitude modulation may be Gaussian, random, in accordance with a waveform (e.g., a sine wave, square wave, etc.), step-wise, in conformance with a predefined pattern (e.g., an increasing then decreasing frequency oscillation, etc.), a result of the application of an algorithm, and/or the like. In certain example embodiments, a dynamic time delay modulation of 40-400 Hz, more preferably 60-300 Hz, and 80-230 H, for example, may be used.

Certain example embodiments may further comprise outputting, through the speaker, an additional masking sound signal, together with the intelligibility-disrupting signal that comprises the generated intelligibility-disrupting formants. For instance, the intelligibility-disrupting signal may be generated to include a prerecorded mix of multiple voices. In addition, or in the alternative, a sound sweetener or the like may be used.

Figure 12:
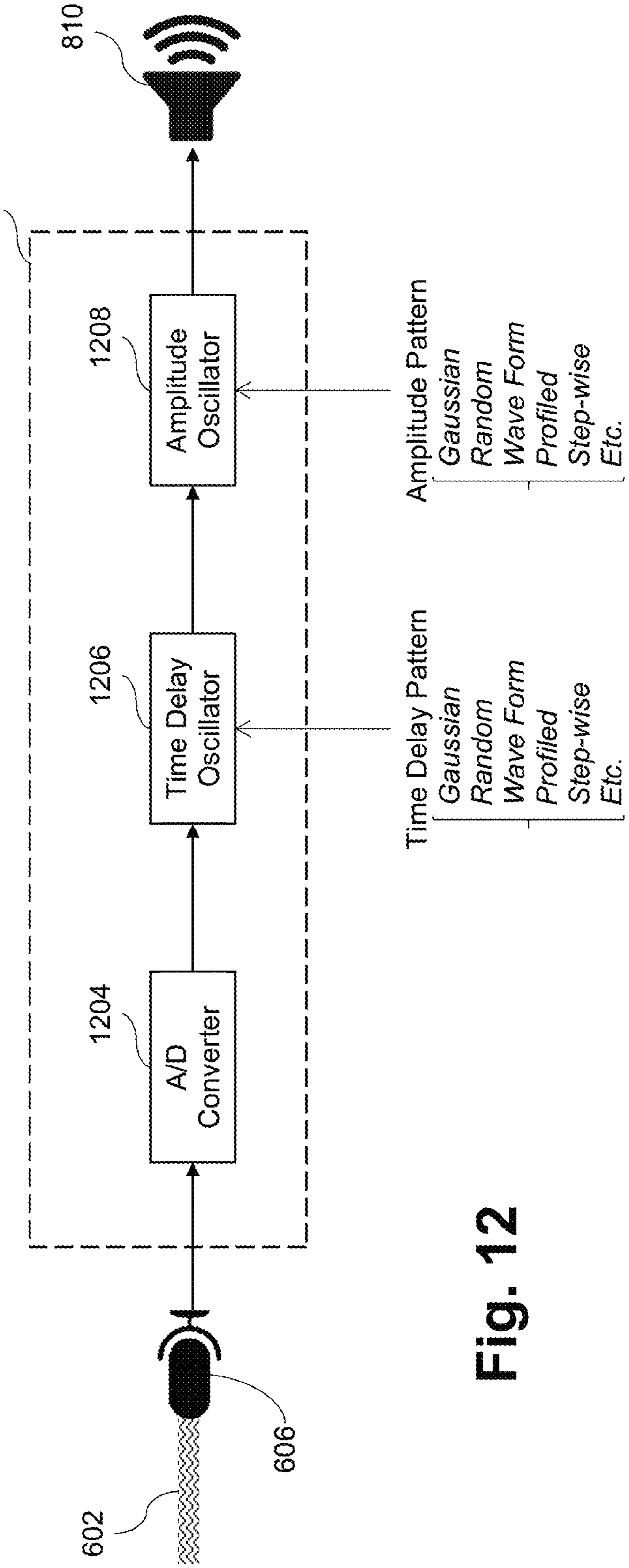
FIG. 12 is a block diagram of an electronic speech intelligibility disrupting device in accordance with certain example embodiments.

This functionality may be incorporated into an electronic device in certain example embodiments. FIG. 12 is a block diagram of an electronic speech intelligibility disrupting device in accordance with certain example embodiments. The electronic device may include or otherwise be coupled to a microphone 606 that receives speech 602, processing circuitry 1202 (e.g., a programmed microchip or an analog device), a power supply (not shown), and a speaker (or speakers) 810 that implement these example techniques. The processing circuitry 1202 receives the original speech signal from the microphone 606 and an optional analog-to-digital converter 1204 converts the original speech signal into a digital representation (e.g., in the event that the microphone is analog). The digitized signal is sent to a time delay oscillator 1206, which uses a time delay pattern to create a replica signal of the original speech signal, modified so that reverberation is added through the oscillating time delays. The signal is then further modified by an amplitude oscillator 1208, which uses an amplitude adjustment pattern to further modify the signal. The thus-modified signal is provided to the speaker 810 for output, as noted above. As noted above, the type of oscillation used for the time delay and amplitude adjustment may be the same or different. Similarly, a system including these elements may incorporated into or provide on a wall, in a defined area (including an open area), and/or the like, e.g., to obscure the content of speech.

As alluded to above, other building blocks of speech may be targeted in certain example embodiments. For instance, fundamental frequencies of speech are known to occur between 85 Hz and 250 Hz. On top of this low-frequency "basic channel," there are additional building blocks of speech, which comprise (a) "inert" vowels that primarily are responsible for the energetic formants determining the "power" of voice, and (b) information-carrying consonants.

Consonants contain little energy but are believed to be essential to intelligibility (at least when it comes to English and other languages), e.g., in the form of the meaning-distinguishing phonological units, i.e. phonemes (defined by both place of articulation and loudness) and frequency-dependent tonemes. Other speech building blocks, such as duration-dependent chronemes, also may be targeted in some instances. Vowels occur between 350 Hz and 2 KHz and are primarily volume-carrying blocks of speech. Targeting the low-volume information-carrying consonants and leaving high-volume vowels intact with the help of a spectral filter may further help reduce the annoyance during speech disruption.

Various consonants differ in the degree of constriction of the vocal cavity and the timing of articulation. Even so, most of them lie in a frequency range between 1.5 kHz and 4 kHz.

Figure 13:
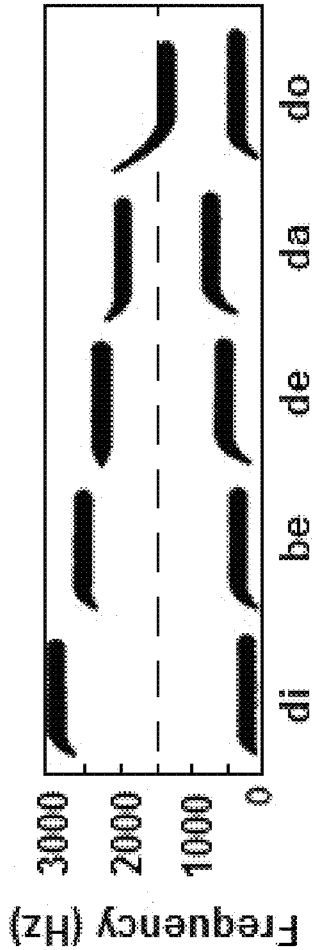
FIG. 13 includes example of the frequency dependence of various syllables, with each including a consonant and a vowel.

In this regard, FIG. 13 includes example of the frequency dependence of various syllables, with each including a consonant and a vowel.

Although the onset formant transition of key consonants differs depending on the following vowel, their phoneme interpretation remains unchanged. This knowledge can be used to trigger speech disruption based on the threshold frequency of consonants, which also may be thought of as primary information-carrying speech units in some instances.

Therefore, in certain example embodiments, the generation of a masking signal may be triggered based on reaching a threshold frequency that is higher than the frequency of most vowels but lower than the frequency of most consonants (e.g., around 1.5 kHz). A preset frequency range of 1.2-2 kHz may be effective in this regard, in certain example embodiments. This approach may help prevent the replication of most vowels, which carry little informational load but contribute to unwanted loudness, and instead may help focus the replica signal on the information-carrying consonants. A high-pass acoustic filter, for example, may be used in this regard. The FIG. 12 block diagram may be used in connection with such example techniques, e.g., provided that such a high-pass acoustic filter is provided prior to the time delay oscillator 1206.

The masking signal in certain example embodiments may oscillate (temporal phasing) in such a way as to provide a delay between 20 ms and 95 ms, which corresponds to the voice onset time (VOT) of most consonants. VOT is the time between the release of a "stop" consonant and the onset of voicing. Modulation frequency of temporal phasing in the 1-10 Hz range may be advantageous, 2-10 Hz being more advantageous, 2-6 Hz being still more advantageous, and with 4 Hz being one example believed to be optimal. Amplitude modulations also may be implemented in certain example embodiments. Amplitude modulations of 10-100% of the original signal, and more preferably 40-90% of the original signal, have been found to be advantageous in this regard.

Certain example techniques that take into account internal reverberations will now be described. As noted above, different rooms have potentially different acoustical properties, including potentially different $T_{60}$ values measured within the room. In rooms with high $T_{60}$ values, too much reverberation can be an issue. For instance, rooms that incorporate glass walls or windows can present an increased challenge when it comes to high intelligibility of speech within the room: Internal reverberations from highly sound-reflecting surfaces act as masking signals. Different rooms (including those with glass) have been found to have annoying internal acoustic reverberations therein, particularly in low-frequency ranges (e.g., 20-200 Hz). Although there are some available solutions that help deal with annoying reverberations in an interior room (including, for example, using various sound-absorbing surfaces), these solutions tend to compromise the glass transparency and tend to add a significant cost.

Certain example embodiments additionally or alternatively provide an acoustic solution for reducing (and sometimes even eliminating) annoying acoustic reverberations within a room or area caused by reverberations in low-frequency ranges. For example, certain example embodiments generate a replica of the original speech signal that has an equalized (or substantially equalized) loudness, but lacks annoying reverberation in the lower portions of the spectrum.

Figure 14:
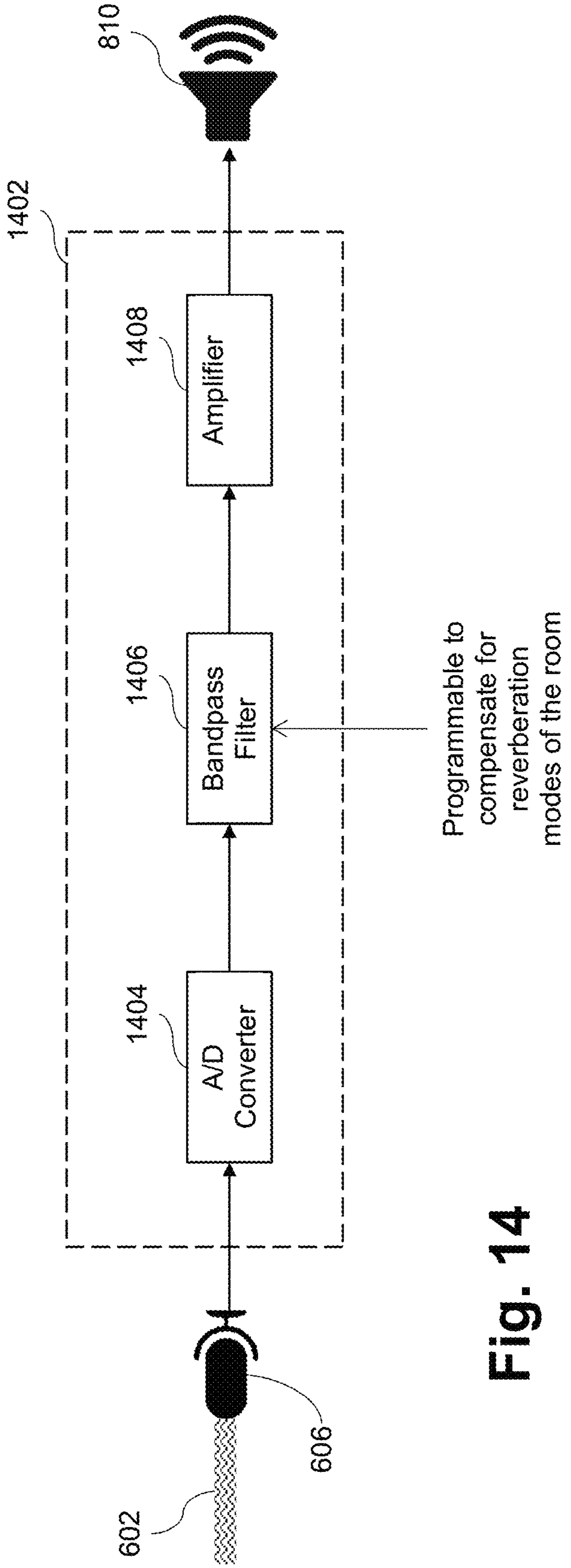
FIG. 14 is a block diagram of an electronic device that helps reduce annoying reverberations in a room, in accordance with certain example embodiments.

FIG. 14 is a block diagram of an electronic device that helps reduce annoying reverberations in a room, in accordance with certain example embodiments. The electronic device may include or otherwise be coupled to a microphone 606 that receives speech 602, processing circuitry 1402 (e.g., a programmed microchip or an analog device), a power supply (not shown), and a speaker (or speakers) 810 that implement these example techniques. The processing circuitry 1402 receives the original speech signal from the microphone 606 and an optional analog-to-digital converter 1404 converts the original speech signal into a digital representation (e.g., in the event that the microphone is analog). The digitized signal is sent to a bandpass filter 1406, which is programmable based on characteristics of the room. That is, during a room-specific calibration process, reverberation modes of the room in which the electronic device are detected. Typically, these reverberation modes exist as 3-4 node and antinode pairs (thus forming standing waves) in the 20-200 Hz range and depend on characteristics of the room including, for example, the rooms geometry, wall material(s), floor coverings, ceiling height/surface material, etc. These and/or other acoustic parameters can be measured using a clap or ping method in which a brisk sound is created and the acoustic properties of the room are automatically recorded, allowing the intensity and spectral position(s) of the node(s) and/or antinode(s) corresponding to the annoying reverberations to be located. In certain example embodiments, these parameters may be stored to a memory location of or otherwise accessible to the processing circuitry 1402 and read by it and used to control the bandpass filter 1406. The bandpass filter 1406 in this way can allow higher frequencies to pass, knowing that the amplifier 1408 can amplify the bandpassed signal in a manner that has the same or substantially the same perceived total loudness, e.g., by virtue of increased intensity of higher frequencies that in essence mask reverberation modes of the low frequencies that are not passed by the bandpass filter 1406, as output via the speaker 810.

In this way, a modified version of the acoustic pattern corresponding to the original speech is generated so that the level of the new, combined sound is equal or substantially equal to the combined level of the original sound and the annoying reverberation. The unwanted reverberation, however, is in essence "cut out" from the resultant spectrum in the modified version of the acoustic pattern, so there are no spikes therein.

It will be appreciated that the shape of the signal that essentially is cut-out may be square-shaped, in the pattern of a sine wave, Gaussian, and/or the like. In certain example embodiments, the shape of the signal that essentially is cut-out may be more precisely tailored to match the shape of the reverberation waveforms. In some instances, a single fundamental reverberation mode may be cut out, whereas in other instances wider frequency ranges will be removed. A delta-function causing an abrupt cutoff may be used in this regard, in certain example embodiments.

Although FIG. 14 shows the bandpass filter 1406 upstream of the amplifier 1408, it will be appreciated that the order of these components may be reversed in certain example embodiments. It also will be appreciated that the processing circuitry 1402 that is responsible for removing unwanted reverberation may be placed downstream of the processing circuitry 1202 that is responsible for disrupting speech intelligibility outside the room in certain example embodiments. Different example embodiments may collocate the functionality of the processing circuitry 1402 that is responsible for removing unwanted reverberation and the processing circuitry 1202 that is responsible for disrupting speech intelligibility in a single device (e.g., on a single chip). It will be appreciated that the electronic component that suppresses reverberation in the room or area may be different from or the same as the component that is intended to suppress intelligibility outside of the room or area, in different example embodiments.

Figure 15:
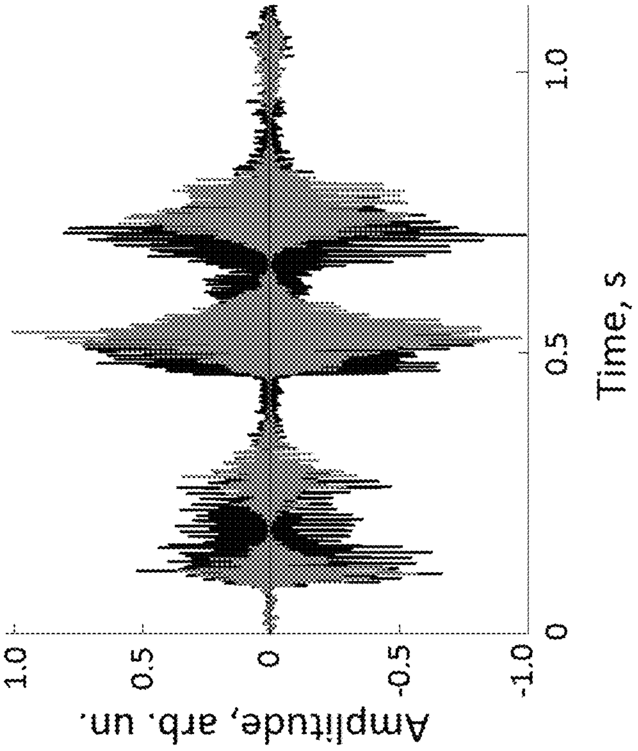
FIG. 15 is a graph showing an example masking signal (grey) superimposed on an original speech signal (black)

FIG. 15 is a graph showing an example masking signal (grey) superimposed on an original speech signal (black). The clone was recorded at an example sampling rate of 8 kHz (although other sampling rates may be used in other example embodiments). It will be appreciated that FIG. 15 shows just one example of how speech can be disrupted. That is, the time delays, amplitude modulations, etc., shown in and/or implied by this graph are provided by way of example, unless expressly claimed.

A test room was set up, and certain example techniques were evaluated. The test room was a typical drywall office with temporarily disabled HVAC fans, a reverberation time of 0.4 s, and no special acoustical insulation. Target speech signals were played with a Yamaha HS5 loudspeaker positioned behind one of the walls with an STC of 30. The signal was registered using a Crown Audio far-field microphone, processed with software, and played with an identical loudspeaker positioned within the room, 2 meters in front of the subject. The software used a combination of the following four audio effects: (1) constant time delay, (2) time delay varying in time (temporal phasing), (3) amplitude modulation, and (4) spectral filtering. Time delay, modulation frequency, and modulation depth were all tunable parameters. The speech stimuli were blocks of 100 prerecorded brief, 5-7 word-long, unrelated, syntactically and semantically correct utterances spoken in a normal pace by a male voice. The utterances were separately presented to each of ten subjects, who subjectively scored the perceived speech recognition and the annoyance of masking sound. All subjects were native speakers of English with normal hearing. The following types of speech maskers were used in the experiment: white noise (WN), a time-delayed clone of a target speech signal (TD), a masker that was an optimized combination of the four audio effects described above (OC), and the OC masker supplemented with a multi-talker background (OCB).

In this test, the time delay of the OC masker was set to 80 ms. Time-delay phasing and amplitude modulation was done at a rate of 3 to 5 modulations per second. Prerecorded speech of three talkers, two males and one female, speaking concurrently was used as background for the OCB masker. The OC optimization was performed to alter the clone signal just enough to smear the essential cues of target speech to make it incomprehensible at a bare minimum expenses of additional annoyance. This approach is voice-activated, and the intensity of the masking signal is constantly self-adjusted to the intensity of the target speech.

The rates of delayed phasing and amplitude modulation of 3-5 cycles per second are similar to the number of syllables per second in a normal English speech, which makes the OC masking highly selective in interfering with verbal rhythms of the target speech, as noted above. For comparison, and also as noted above, white noise and Nature sounds are poor speech maskers at moderate loudness because their temporal patterns are different from that of normal speech. Further minimization of the annoyance related to masking was performed using a spectral filter. The spectral filter balanced the contribution of spectral regions responsible for the energetic vowels and information-carrying consonants.

Figure 16:
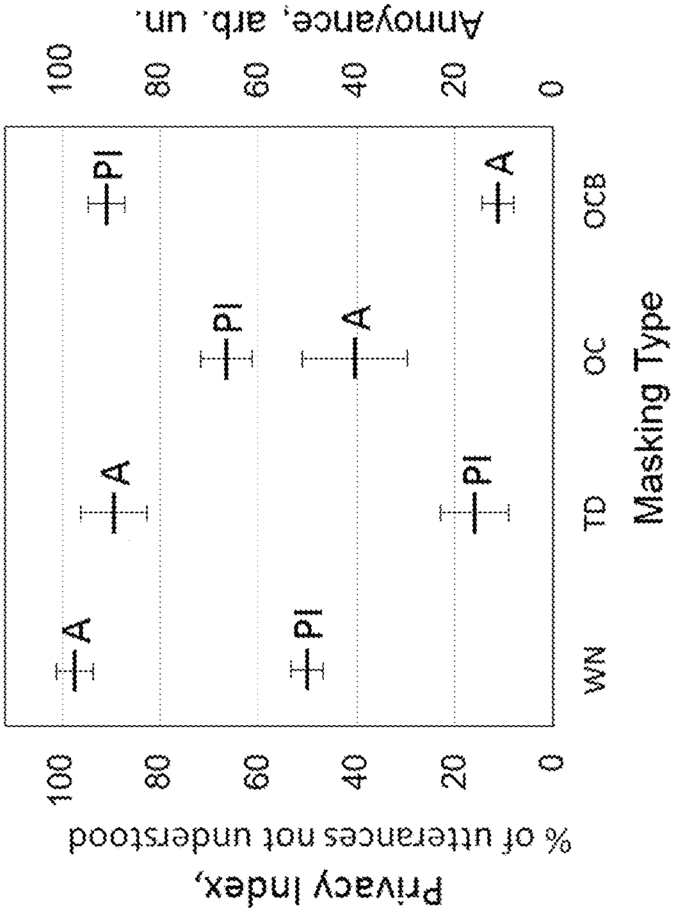
FIG. 16 provides test data derived from a sample made in accordance with certain example embodiments.

The scoring results are presented in FIG. 16. For a numeric rating, the decibel levels of all the four maskers were brought to that of WN at which 50% of sentences were perceived unintelligible. In the case of WN and TD maskers, all ten subjects reported a sustained attention to the annoyance and a considerable cognitive fatigue at masking levels when speech was still audible but no words could be understood. In the case of OC and OCB masking, no cognitive fatigue was reported, and the annoyance levels were drastically lower. After about 30 s of using OCB masking, most of the subjects stopped paying attention to the content-deficient speech. Three subjects reported perceiving the OC-masked speech as a foreign language.

From the FIG. 16 data, it will be appreciated that certain example embodiments are able to provide a perceptually effective technique for speech masking, in which the cues related to speech intelligibility are smeared by temporal phasing and amplitude modulation of the target signal. The relationship between the perceived speech intelligibility and the annoyance has been evaluated in a subjective rating analysis. The approach advantageously is voice-activated and automatically adjusts to psycholinguistic aspects and acoustic-phonetic cues of speech. It can be used in standalone sound masking devices or be an integrated part of office walls in architectural aural spaces with low STC levels and high flanking losses, as well as in the other applications discussed herein.

Methods of making the above-described and/or other walls and wall assemblies are also contemplated herein. For the example active approaches described herein, such methods may include, for example, erecting walls, connecting microphones and air pumps to sound masking circuits, etc. Configuration steps for sound masking circuits (e.g., specifying one or more frequency ranges of interest, when/how to actuate an air pump, etc.) also are contemplated. Mounting operations may be used, e.g., with respect to the microphone and/or the air pump (including the hanging of speakers), etc. Integration with HVAC systems and/or the like also is contemplated.

In a similar vein, methods of retrofitting existing walls and/or wall assemblies also are contemplated and may include the same or similar steps. Retrofit kits also are contemplated herein.

Certain example embodiments have been described in connection with acoustic walls and acoustic wall assemblies. It will be appreciated that these acoustic walls and acoustic wall assemblies may be used in a variety of applications to alter perceived speech patterns, obscure certain irritating sound components emanated from adjacent areas, and/or the like. Example applications include, for example, acoustic walls and acoustic wall assemblies for rooms in a house; rooms in an office; defined waiting areas at doctors' offices, airports, convenience stores, banks, malls, etc.; exterior acoustic walls and acoustic wall assemblies for homes, offices, and/or other structures; outer elements (e.g., doors, sunroofs, or the like) for vehicles, as well as inner areas for vehicles (e.g., so that sitting in the front seats can be acoustically obscured from their children sitting in the back seats, and vice versa); etc. Sound masking may be provided for noises emanating from an adjacent area, regardless of whether that adjacent area is another room, outside of the confines of the structure housing the acoustic wall and acoustic wall assembly, etc. Similarly, sound masking may be provided to prevent noises from entering into an adjacent area of this or other sort.

In certain example embodiments, a method for disrupting speech intelligibility is provided, the method comprising:

receiving, via a microphone, an original speech signal corresponding to original speech; generating an intelligibility-disrupting masking signal comprising smeared cues of the original speech in the original speech signal; and reducing the level of intelligibility of the original speech signal by outputting, through a speaker, the intelligibility-disrupting masking signal comprising the smeared speech cues.

In addition to the features of the previous paragraph, in certain example embodiments, the intelligibility-disrupting masking signal may be time delayed relative to the original speech signal, e.g., by 20-150 ms, 80 ms, etc.

In addition to the features of the previous paragraph, in certain example embodiments, the time delay may oscillate in time, e.g., with the time delay oscillates in time in relation to the original signal within a range of 80-230 ms.

In addition to the features of any of the three previous paragraphs, in certain example embodiments, the intelligibility-disrupting masking signal may be generated such that the amplitude of the intelligibility-disrupting masking signal is modulated in time.

In addition to the features of any of the four previous paragraphs, in certain example embodiments, the intelligibility-disrupting masking signal may be generated such that gain corresponding to the intelligibility-disrupting masking signal added to the original speech signal is 0.05-0.25%.

In addition to the features of any of the five previous paragraphs, in certain example embodiments, the time delay may oscillate with an oscillation frequency of 1-10 Hz, e.g., with the time delay oscillating with an oscillation frequency of 2-6 Hz.

In addition to the features of any of the six previous paragraphs, in certain example embodiments, smeared cues may be generated at a frequency of 0.01-20 Hz, e.g., at a frequency of 2-6 Hz.

In addition to the features of any of the seven previous paragraphs, in certain example embodiments, the method may further comprise outputting, through the speaker, the intelligibility-disrupting masking signal together with a prerecorded mix of multiple voices, e.g., with the prerecorded mix of multiple voices comprises 2-7 different voices, 3 different voices, etc.

In certain example embodiments, a speech intelligibility disrupting device comprising control circuitry may be configured to implement the functionality of any of the eight previous paragraphs.

In certain example embodiments, a system may include the device of the previous paragraph.

In certain example embodiments, a wall may incorporate the system of the previous paragraph.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for disrupting speech intelligibility, the method comprising:
   - receiving, via a microphone, an original speech signal corresponding to original speech;
   - generating an intelligibility-disrupting masking signal comprising smeared cues of the original speech in the original speech signal; and
   - reducing the level of intelligibility of the original speech signal by outputting, through a speaker, the intelligibility-disrupting masking signal comprising the smeared speech cues,
   - wherein the intelligibility-disrupting masking signal is time delayed relative to the original speech signal,
   - wherein the intelligibility-disrupting masking signal is generated such that the amplitude of the intelligibility-disrupting masking signal is modulated in time, and
   - wherein the time delay oscillates in time.

2. The method of claim 1, wherein the intelligibility-disrupting masking signal is time-delayed by 20-150 ms.

3. The method of claim 1, wherein the intelligibility-disrupting masking signal is time-delayed by 80 ms.

4. The method of claim 1, wherein the time delay oscillates in time in relation to the original signal within a range of 80-230 ms.

5. The method of claim 4, further comprising generating the intelligibility-disrupting masking signal such that gain corresponding to the intelligibility-disrupting masking signal added to the original speech signal is 0.05-0.25%.

6. The method of claim 1, wherein the time delay oscillates with an oscillation frequency of 1-10 Hz.

7. The method of claim 6, wherein the time delay oscillates with an oscillation frequency of 2-6 Hz.

8. The method of claim 1, wherein smeared cues are generated at a frequency of 0.01-20 Hz.

9. The method of claim 8, wherein smeared cues are generated at a frequency of 2-6 Hz.

10. The method of claim 1, further comprising outputting, through the speaker, the intelligibility-disrupting masking signal together with a prerecorded mix of multiple voices.

11. The method of claim 10, wherein the prerecorded mix of multiple voices comprises 2-7 different voices.

12. The method of claim 10, wherein the prerecorded mix of multiple voices comprises 3 different voices.

13. A speech intelligibility disrupting device, comprising:
   - control circuitry configured to:
     - receive, from a microphone, an original speech signal corresponding to original speech;
     - generate an intelligibility-disrupting masking signal comprising smeared cues of the original speech in the original speech signal, the cues being smeared through control circuitry induced reverberation of the original speech signal; and
     - cause a speaker to output the intelligibility-disrupting masking signal comprising the smeared speech cues to reduce the level of intelligibility of the original speech signal,
   - wherein the intelligibility-disrupting masking signal is time delayed relative to the original speech signal, and
   - wherein the intelligibility-disrupting masking signal is generated such that the amplitude of the intelligibility-disrupting masking signal is modulated in time.

14. The device of claim 13, wherein the intelligibility-disrupting masking signal is time-delayed by 20-150 ms.

15. The device of claim 13, wherein the time delay oscillates in time.

16. The device of claim 15, wherein the time delay oscillates in time in relation to the original signal within a range of 80-230 ms.

17. The device of claim 16, wherein the intelligibility-disrupting masking signal is generated such that gain corresponding to the intelligibility-disrupting masking signal added to the original speech signal is 0.05-0.25%.

18. The device of claim 15, wherein the time delay oscillates with an oscillation frequency of 1-10 Hz.

19. The device of claim 13, wherein smeared cues are generated at a frequency of 2-6 Hz.

20. The device of claim 13, further comprising outputting, through the speaker, the intelligibility-disrupting masking signal together with a prerecorded mix of multiple voices.

21. The speech intelligibility disrupting device of claim 13, wherein the reverberation includes temporal phasing and amplitude modulation of the target signal.

22. The speech intelligibility disrupting device of claim 13, wherein the control circuitry is voice-activated, and wherein the control circuitry is configured to automatically adjusts to psycholinguistic aspects and acoustic-phonetic cues of the original speech in generating the intelligibility-disrupting masking signal.

23. The speech intelligibility disrupting device of claim 13, wherein the reverberation is generated to disrupt the rhythm of the original speech, mask acoustic cues of overlapping syllables and vowels, and/or eliminate artificially created infra-sound with sub-threshold frequencies that resonate adversely with the brain waves.

24. The speech intelligibility disrupting device of claim 13, wherein output of the intelligibility-disrupting masking signal causes the original speech signal to be perceivable as an unintelligible foreign language.

25. A speech intelligibility disrupting system, comprising:

a microphone;

a speaker; and control circuitry configured to:

receive, from the microphone, an original speech signal corresponding to original speech;

generate an intelligibility-disrupting masking signal comprising smeared cues of the original speech in the original speech signal; and cause the speaker to output the intelligibility-disrupting masking signal comprising the smeared speech cues to reduce the level of intelligibility of the original speech signal, wherein the intelligibility-disrupting masking signal is time delayed relative to the original speech signal, the time delay oscillating in time, and wherein the intelligibility-disrupting masking signal is generated such that the amplitude of the intelligibility-disrupting masking signal oscillates in time.

26. An acoustic wall, comprising the system of claim 25.

* * * * *